(12) United States Patent
Erukulla et al.

(10) Patent No.: US 12,450,083 B2
(45) Date of Patent: Oct. 21, 2025

(54) SYSTEM AND METHOD FOR DEPLOYING A SOFTWARE-DEFINED DATA CENTER BASED ON DESIRED STATE SPECIFICATION FROM VIRTUALIZATION SOFTWARE

(71) Applicant: VMware, Inc., Palo Alto, CA (US)

(72) Inventors: Uday Kiran Erukulla, Milpitas, CA (US); Prashanth Suresh, Mountain View, CA (US); Jeffrey Gabriel Hu, Palo Alto, CA (US); Abhay Manandhar, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 608 days.

(21) Appl. No.: 17/709,836

(22) Filed: Mar. 31, 2022

(65) Prior Publication Data

US 2023/0315505 A1    Oct. 5, 2023

(51) Int. Cl.
*G06F 9/455* (2018.01)
*G06F 9/4401* (2018.01)

(52) U.S. Cl.
CPC ........ *G06F 9/45558* (2013.01); *G06F 9/4416* (2013.01); *G06F 2009/45595* (2013.01)

(58) Field of Classification Search
CPC ............... G06F 9/45558; G06F 9/4416; G06F 2009/45595
See application file for complete search history.

(56) References Cited

U.S. PATENT DOCUMENTS

| | | | | |
|---|---|---|---|---|
| 2010/0070970 | A1* | 3/2010 | Hu | G06F 9/45533 718/1 |
| 2016/0048408 | A1* | 2/2016 | Madhu | H04L 47/783 718/1 |
| 2016/0156522 | A1* | 6/2016 | Jubran | H04L 41/122 709/224 |
| 2016/0292606 | A1* | 10/2016 | Mukherjee | G06Q 10/087 |
| 2019/0377592 | A1* | 12/2019 | Verma | G06F 9/45558 |
| 2020/0241910 | A1* | 7/2020 | Verma | G06F 9/5044 |
| 2020/0379793 | A1* | 12/2020 | Parihar | G06F 9/45558 |

OTHER PUBLICATIONS

Shuo Yang, Compass: A Data Center Bootloader for Software Defined Infrastructure; 2015, IARIA pp. 98-103 (Year: 2015).*

* cited by examiner

*Primary Examiner* — Dong U Kim
(74) *Attorney, Agent, or Firm* — King Intellectual Asset Management

(57) ABSTRACT

System and method for deploying software-defined data centers (SDDCs) in target computing environments uses a software-defined data center (SDDC) bootstrap service running in a virtualization software of a host computer in a target computing environment to deploy a plurality of management components of the SDDC being deployed in the target computing environment. After the management components of the SDDC have been deployed in the target computing environment, the SDDC is configured to a desired state by an SDDC configuration service running in one of the management components of the SDDC using an SDDC desired state specification.

20 Claims, 16 Drawing Sheets

SYSTEM AND METHOD FOR DEPLOYING A SOFTWARE-DEFINED DATA CENTER BASED ON DESIRED STATE SPECIFICATION FROM VIRTUALIZATION SOFTWARE

BACKGROUND

Software-defined data centers (SDDCs) may be deployed in any computing environment. As an example, SDDCs may be deployed in a dedicated private cloud environment of a public cloud for an entity or customer via a cloud service provider, where each SDDC may include one or more clusters of host computers. Such dedicated private cloud environments may be managed by a cloud service provider, which uses a public cloud operated by a public cloud provider.

Deploying an SDDC in a computing environment requires deployment orchestration of various management and compute components of the SDDC, which are then configured to desired states. Such deployment orchestration may require one or more external services that deploy the SDDC components in the target computing environment and then allow administrators to configure the SDDC components. For some SDDC deployment solutions, new software must be shipped to a customer to be executed in order to deploy the SDDC in the target computing environment.

SUMMARY

System and method for deploying software-defined data centers (SDDCs) in target computing environments uses a software-defined data center (SDDC) bootstrap service running in a virtualization software of a host computer in a target computing environment to deploy a plurality of management components of the SDDC being deployed in the target computing environment. After the management components of the SDDC have been deployed in the target computing environment, the SDDC is configured to a desired state by an SDDC configuration service running in one of the management components of the SDDC using an SDDC desired state specification.

A computer-implemented method for deploying software-defined data centers (SDDCs) in target computing environments in accordance with an embodiment of the invention includes receiving a request to deploy a software-defined data center (SDDC) in a target computing environment at an SDDC bootstrap service running in a virtualization software of a host computer in the target computing environment, wherein the virtualization software of the host computer is configured to support at least one virtual computing instance on the host computer; in response to the request, deploying a plurality of management components of the SDDC in the target computing environment using the SDDC bootstrap service, wherein a particular management component of the management components includes an SDDC configuration service; and after deploying the management components of the SDDC in the target computing environment, configuring the SDDC to a desired state by the SDDC configuration service running in the particular management component using an SDDC desired state specification. In some embodiments, the steps of this method are performed when program instructions contained in a non-transitory computer-readable storage medium are executed by one or more processors.

A computer system in accordance with an embodiment of the invention comprises memory and at least one processor configured to receive a request to deploy a software-defined data center (SDDC) in a target computing environment at an SDDC bootstrap service running in a virtualization software of a host computer in the target computing environment, wherein the virtualization software of the host computer is configured to support at least one virtual computing instance on the host computer; in response to the request, deploy a plurality of management components of the SDDC in the target computing environment using the SDDC bootstrap service, wherein a particular management component of the management components includes an SDDC configuration service; and after deploying the management components of the SDDC in the target computing environment, configure the SDDC to a desired state by the SDDC configuration service running in the particular management component using an SDDC desired state specification.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
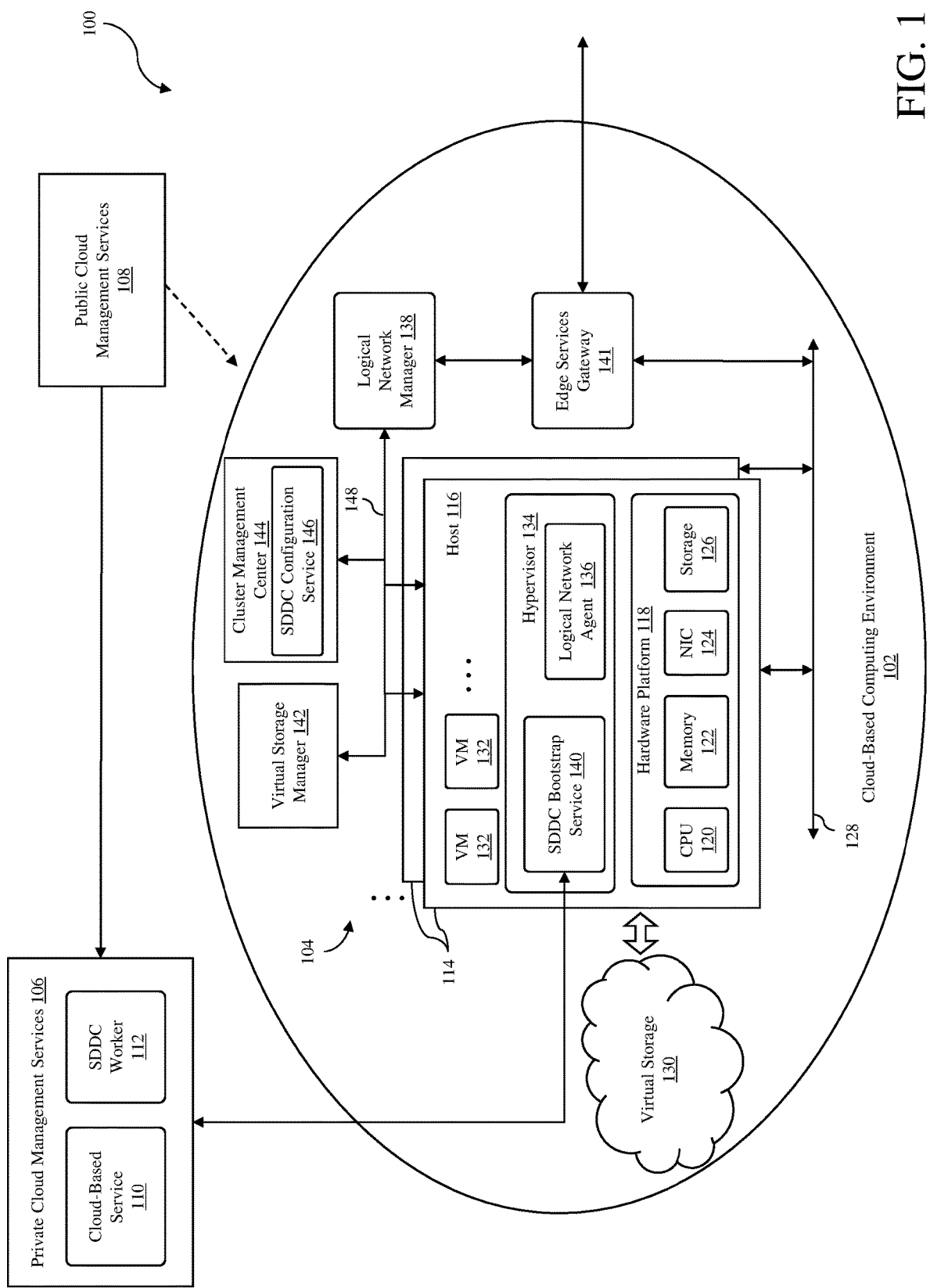
FIG. 1 is a block diagram of a computing system in accordance with an embodiment of the invention.

Turning now to FIG. 1, a computing system 100 in accordance with an embodiment of the invention is illustrated. The computing system 100 includes a cloud-based computing environment 102 in which a software-defined data center (SDDC) 104 is deployed. As an example, the cloud-based computing environment 102 may be a virtual private cloud (VPC) in a public cloud environment, for example, a VMware Cloud in an AWS public cloud. However, in other embodiments, the SDDC 104 can be configured as any software-defined computing network.

As shown in FIG. 1, the computing system 100 further includes private cloud management services 106, which reside in the public cloud environment outside of the cloud-based computing environment 102. The private cloud management services 106 provide various services for administrators to create and manage cloud-based computing environments, such as the cloud-based computing environment 102, in the public cloud environment. In addition, the private cloud management services 106 provide services for the administrators to create SDDCs, such as the SDDC 104, in the cloud-based computing environments. As part of some of these services, the private cloud management services 106 may communicate with public cloud management services 108, which manage the public cloud environment in which the cloud-based computing environments are created. As an example, the public cloud management services 108 can provide hardware and/or software needed to create, maintain, update and/or delete the cloud-based computing environments in the public cloud environment.

The services provided by the private cloud management services 106 may be requested by the administrators using a graphic user interface (GUI), which may be provided by a web-based application or by an application running on a computer system that can access the private cloud management services 106. In some situations, some of these services may be requested by an automated process running in the private cloud management services 106 or on a computer system that can access the private cloud management services 106.

As illustrated, the private cloud management services 106 include at least a cloud-based service 110 and a software-defined data center (SDDC) worker 112. The cloud-based service 110 provides back-end services for the cloud-based computing environments, such as deploying new SDDCs in the cloud-based computing environments and restoring one or more management components in the SDDCs. The cloud-based service 110 and the SDDC worker 112 are further described below.

As shown in FIG. 1, the SDDC 104 includes a cluster 114 of host computers ("hosts") 116. The hosts 116 may be constructed on a server grade hardware platform 118, such as an x86 architecture platform, which may be provided by the public cloud management services 108. As shown, the hardware platform 118 of each host 116 may include conventional components of a computer, such as one or more processors (e.g., CPUs) 120, system memory 122, a network interface 124, and storage 126. The processor 120 can be any type of a processor commonly used in servers. The memory 122 is volatile memory used for retrieving programs and processing data. The memory 122 may include, for example, one or more random access memory (RAM) modules. The network interface 124 enables the host 116 to communicate with other devices that are inside or outside of the cloud-based computing environment 102 via a communication network, such as a network 128. The network interface 124 may be one or more network adapters, also referred to as network interface cards (NICs). The storage 126 represents one or more local storage devices (e.g., one or more hard disks, flash memory modules, solid state disks and/or optical disks), which are used as part of a virtual storage 130 (e.g., virtual storage area network (SAN)), which is described in more detail below.

Each host 116 may be configured to provide a virtualization layer that abstracts processor, memory, storage and networking resources of the hardware platform 118 into virtual computing instances (VCIs) 132 that run concurrently on the same host. As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, California. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines, although embodiments of the invention described herein are not limited to virtual machines (VMs).

In the illustrated embodiment, the VCIs in the form of VMs 132 are provided by host virtualization software 134, which is referred to herein as a hypervisor, that enables sharing of the hardware resources of the host by the VMs. One example of the hypervisor 134 that may be used in an embodiment described herein is a VMware ESXi™ hypervisor provided as part of the VMware vSphere® solution made commercially available from VMware, Inc. The hypervisor 134 may run on top of the operating system of the host or directly on hardware components of the host. For other types of VCIs, the host may include other virtualization software platforms to support those VCIs, such as Docker virtualization platform to support "containers". Although embodiments of the inventions may involve other types of VCIs, various embodiments of the invention are described herein as involving VMs.

In the illustrated embodiment, the hypervisor 134 includes a logical network (LN) agent 136, which operates to provide logical networking capabilities, also referred to as "software-defined networking". Each logical network may include software managed and implemented network services, such as bridging, L3 routing, L2 switching, network address translation (NAT), and firewall capabilities, to support one or more logical overlay networks in the cloud-based computing environment 102. The logical network agent 136 may receive configuration information from a logical network manager 138 (which may include a control plane cluster) and, based on this information, populates forwarding, firewall and/or other action tables for dropping or directing packets between the VMs 132 in the host 116, other VMs on other hosts, and/or other devices outside of the cloud-based computing environment 102. Collectively, the logical network agent 136, together with other logical network agents on other hosts, according to their forwarding/routing tables, implement isolated overlay networks that can connect arbitrarily selected VMs with each other. Each VM may be arbitrarily assigned a particular logical network in a manner that decouples the overlay network topology from the underlying physical network. Generally, this is achieved by encapsulating packets at a source host and decapsulating packets at a destination host so that VMs on the source and destination can communicate without regard to the underlying physical network topology. In a particular implementation, the logical network agent 136 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols, such as stateless transport tunneling (STT), Network Virtualization using Generic Routing Encapsulation (NVGRE), or Geneve, instead of, or in addition to, VXLAN.

The hypervisor 134 may also include a local scheduler and a high availability (HA) agent, which are not illustrated. The local scheduler operates as a part of a resource scheduling system that provides load balancing among enabled hosts 116 in the cluster 114. The HA agent operates as a part of a high availability system that provides high availability of select VMs running on the hosts 116 in the cluster 114 by monitoring the hosts, and in the event of a host failure, the VMs on the failed host are restarted on alternate hosts in the cluster.

The hypervisor 134 further includes an SDDC bootstrap service 140, which operates to bootstrap and configure various components to create a new SDDC, such as the SDDC 104, using an SDDC desired state (DS) specification, as described in detail below. The SDDC bootstrap service 140 may also be configured to restore at least some of the management components in an existing SDDC when needed, which is also described in detail below.

As noted above, the SDDC 104 also includes the logical network manager 138 (which may include a control plane cluster), which operates with the logical network agents 136 in the hosts 116 to manage and control logical overlay networks in the SDDC (sometimes referred to herein as the "SDDC logical overlay network"). In some embodiments, the SDDC 104 may include multiple logical network managers that provide the SDDC logical overlay network. Logical overlay networks comprise logical network devices and connections that are mapped to physical networking resources, e.g., switches and routers, in a manner analogous to the manner in which other physical resources as compute and storage are virtualized. In an embodiment, the logical network manager 138 has access to information regarding physical components and logical overlay network components in the SDDC 104. With the physical and logical overlay network information, the logical network manager 138 is able to map logical network configurations to the physical network components that convey, route, and filter physical traffic in the SDDC 104. In a particular implementation, the logical network manager 138 is a VMware NSX® Manager™ product running on any computer, such as one of the hosts 116 or VMs 132 in the SDDC 104.

The SDDC 104 also includes one or more edge services gateway 141 to control network traffic into and out of the SDDC. In a particular implementation, the edge services gateway 141 is VMware NSX® Edge™ product made available from VMware, Inc. running on any computer, such as one of the hosts 116 or VMs 132 in the SDDC 104. The logical network manager(s) 138 and the edge services gateway(s) 141 are part of a logical network platform, which supports the software-defined networking in the SDDC 104.

In the illustrated embodiment, the SDDC 104 includes a virtual storage manager 142, which manages the virtual SAN 130. As noted above, the virtual SAN 130 leverages local storage resources of host computers 116, which are part of the logically defined cluster 114 of hosts that is managed by a cluster management center 144 in the computing system 100. The virtual SAN 130 allows the local storage resources of the hosts 116 to be aggregated to form a shared pool of storage resources, which allows the hosts 116, including any VMs running on the hosts, to use the shared storage resources. The virtual SAN 130 may be used to store any data, including virtual disks of the VMs. In an embodiment, the virtual storage manager 142 is a computer program that resides and executes in a computer system, such as one of the hosts 116, or in one of the VMs 132 running on the hosts 116.

The SDDC 104 also includes the cluster management center 144, which operates to manage and monitor the cluster 114 of hosts 116. The cluster management center 144 may be configured to allow an administrator to create a cluster of hosts, add hosts to the cluster, delete hosts from the cluster and delete the cluster. The cluster management center 144 may further be configured to monitor the current configurations of the hosts 116 in the cluster 114 and the VMs running on the hosts. The monitored configurations may include hardware and/or software configurations of each of the hosts 116. The monitored configurations may also include VM hosting information, i.e., which VMs are hosted or running on which hosts. In order to manage the hosts 116 and the VMs 132 in the cluster, the cluster management center 144 support or execute various operations. As an example, the cluster management center 144 may be configured to perform resource management operations for the cluster 114, including VM placement operations for initial placement of VMs and load balancing.

In an embodiment, the cluster management center 144 is a computer program that resides and executes in a computer system, such as one of the hosts 116, or in one of the VMs 132 running on the hosts 116. One example of the cluster management center 144 is the VMware vCenter Server® product made available from VMware, Inc.

As shown in FIG. 1, the cluster management center 144 includes an SDDC configuration service 146, which operates to configure the SDDC 104 to a desired state during an SDDC deployment operation or during a restore operation of one or more management components in the SDDC 104. The state of the SDDC 104 includes, but not limited to, the state of the cluster 114 of the hosts 116, the state of the logical overlay networks of the SDDC and the state of the virtual SAN 130 of the SDDC, which are described in more detail below.

In the illustrated embodiment, the management components of the SDDC 104, such as the logical network manager 138, the edge services gateway 141, the virtual storage manager 142 and the cluster management center 144, communicate using a management network 148, which may be separate from the network 128, which are used by the hosts 116 and the VMs 132 on the hosts. In an embodiment, at least some of the management components of the SDDC 104 may be implemented in one or more virtual computing instance, e.g., VMs 132, running in the SDDC 104. In some embodiments, there may be multiple instances of the logical network manager 138 and the edge services gateway 141 that are deployed in multiple VMs running in the computing system 100. In a particular implementation, the virtual storage manager 142 may be incorporated or integrated into the cluster management center 144. Thus, in this implementation, the cluster management center 144 would also perform tasks of the virtual storage manager 142.

Unlike conventional solutions that require external services and components to deploy SDDCs in computing environments, such as the SDDC 104 in the cloud-based computing environment 102, the deployment solution in accordance with embodiments of the invention uses the SDDC bootstrap service 140 in the hypervisor 134 of one of the hosts 116 to deploy the SDDC 104. In addition, new software that may be required for administrators to deploy SDDCs is eliminated. Rather, the SDDC deployment solution in accordance with embodiments of the invention uses the SDDC bootstrap service 140 that exists in the hypervisor 134 to deploy various management components of the SDDC 104, including the cluster management center 144 with the SDDC configuration service 146. The SDDC 104 is then configured to a desired state using the SDDC configuration service 146, as explained in detail below.

A process of deploying a new SDDC in the computing system 100 in accordance with an embodiment of the invention is described with reference to a flow diagram of FIG. 2 using the SDDC 104 shown in FIG. 1 as an example. The SDDC deployment process is initiated in response to user input requesting the new SDDC 104 to be deployed. In an embodiment, the user input may be received at the cloud-based service 110 via a graphic user interface (GUI), which may be provided by a web-based application or by an application running on a computer system that can access the cloud-based service 110. In an embodiment, the user input for creating the SDDC 104 may include, but not limited to, the name of the SDDC to be created, the number of host computers for the SDDC, and network Classless Inter-Domain Routing (CIDR) range.

Figure 2:
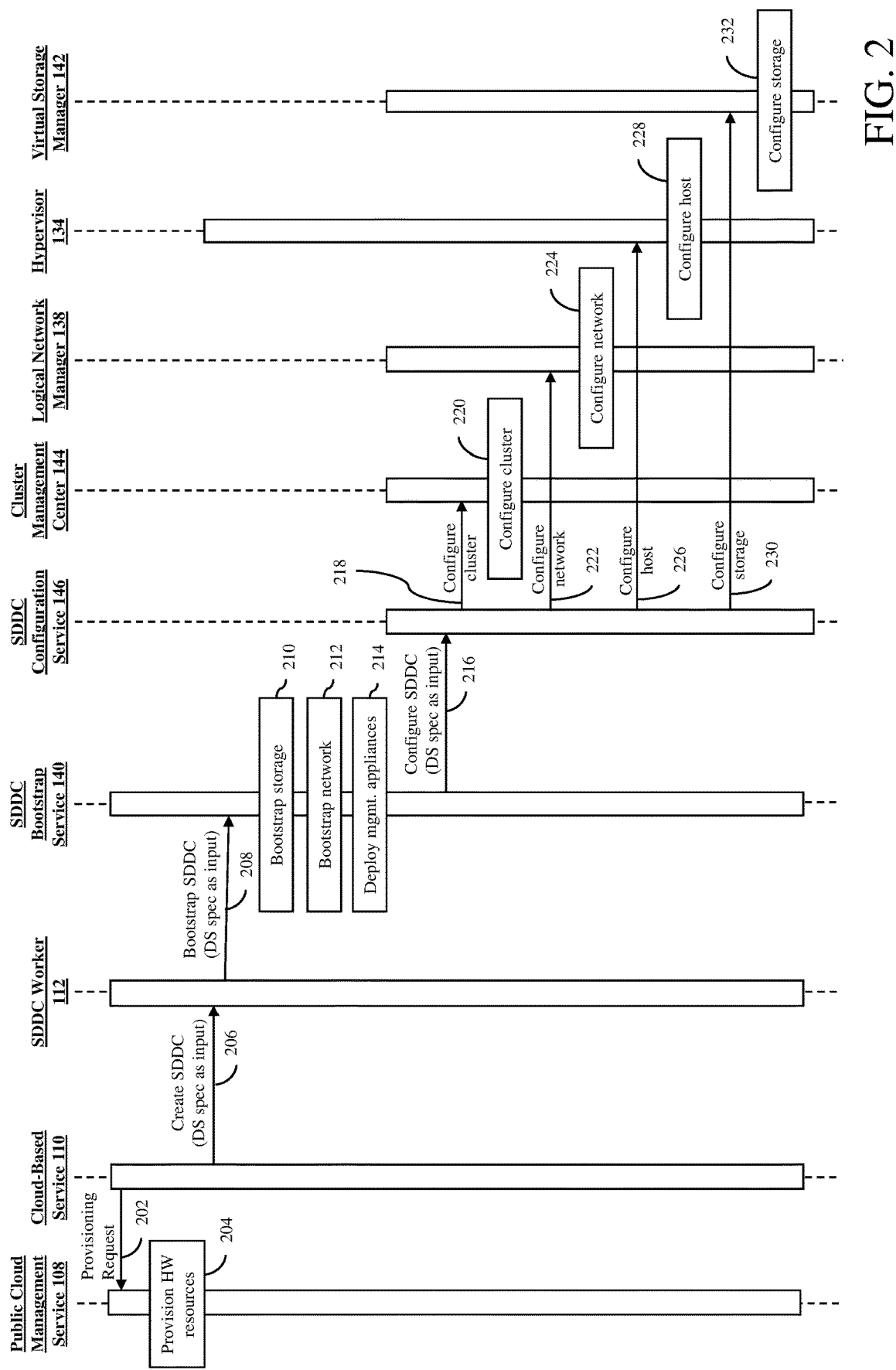
FIG. 2 is a flow diagram of a process of deploying a new software-defined data center (SDDC) in the computing system shown in FIG. 1 in accordance with an embodiment of the invention.

As shown in FIG. 2, the SDDC deployment process begins at step 202, in response to the received user request, a provisioning request is sent to the public cloud management services 108 from the cloud-based service 110 for hardware resources for the SDDC 104 to be deployed. The hardware resources being requested may be one or more host computers or bare metal instances. In some embodiments, a new cloud-based computing environment may be created and defined with the hardware resources. However, in other embodiments, the hardware resources may be added to an existing cloud-based computing environment.

Figure 3:
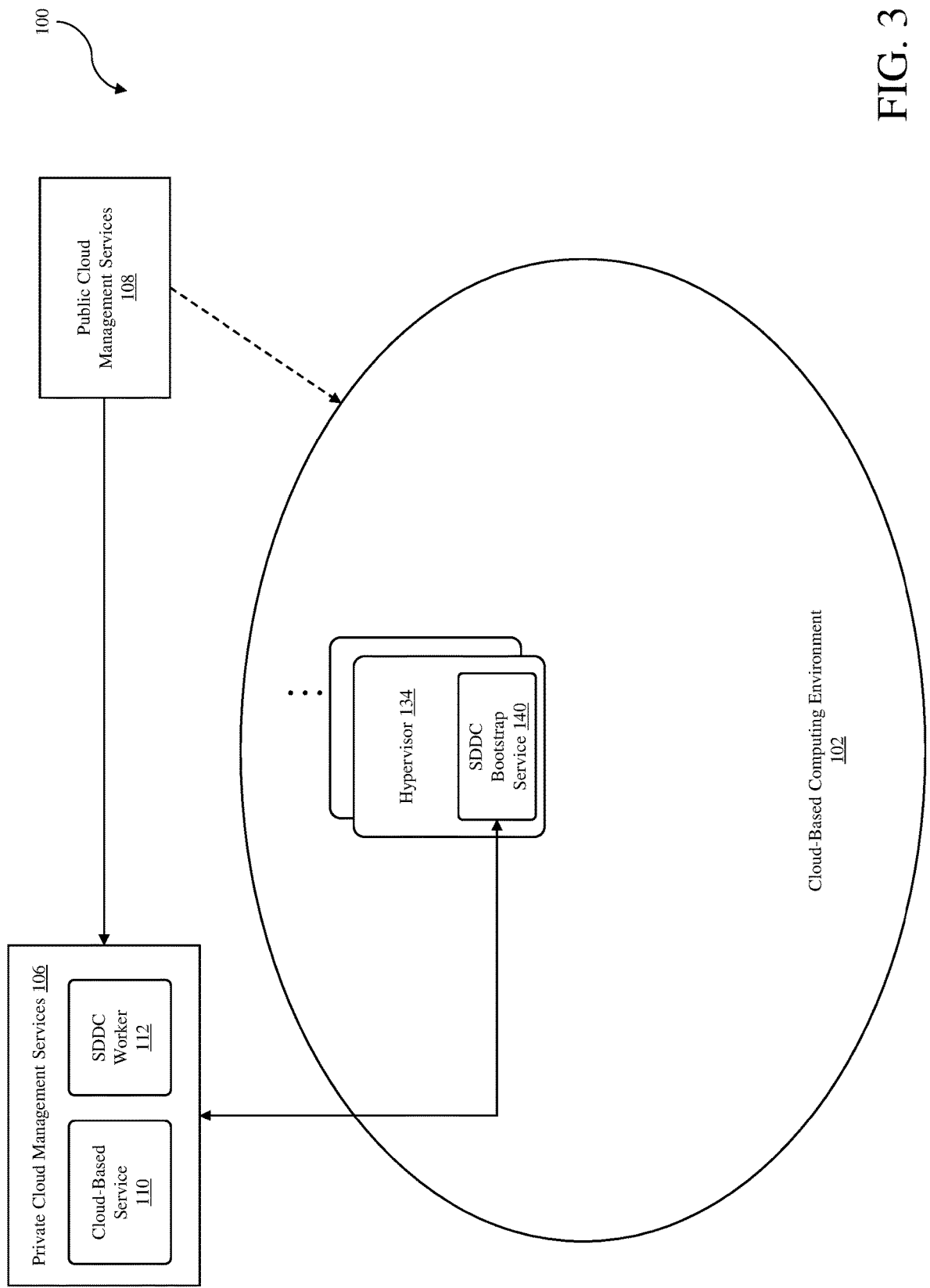
FIG. 3 illustrates hypervisors with an SDDC bootstrap service in a target cloud-based computing environment before management components of an SDDC being created are deployed in accordance with an embodiment of the invention.

Next, at step 204, in response to the provisioning request, the hardware resources that are requested are provisioned in the target cloud-based computing environment, which may be created for the provisioning or an existing cloud-based computing environment. In some embodiments, the provisioned host computers may include host virtualization software, e.g., the hypervisor 134, already installed. In other embodiments, the host virtualization software may be installed in the provisioned host computers under the direction of the cloud-based service 110. Thus, one or more host computers having a hypervisor 134 with the SDDC bootstrap service 140 are provisioned in the target cloud-based computing environment, e.g., the cloud-based computing environment 102, as illustrated in FIG. 3, which shows the hypervisors 134 without the host computers in the cloud-based computing environment 102.

Next, at step 206, an instruction with an SDDC desired state (DS) specification to create the SDDC 104 is transmitted to the SDDC worker 112 from the cloud-based service 110, which is processed by the SDDC worker to fulfill the instruction. The SDDC DS specification includes all the information needed to deploy the necessary components for the SDDC being created and to configure the SDDC to a desired state with respect to a cluster of hosts, virtual storage and logical overlay networks of the SDDC. As an example, the SDDC DS specification may include information needed to create storage and network resources for the management components of the SDDC 104 being deployed (e.g., the logical network manager 138, the edge services gateway 141, the virtual storage manager 142 and the cluster management center 144), information needed to deploy the management components, and information needed to configure the cluster of hosts, the virtual storage and the logical overlay networks of the SDDC to the desired states. In an embodiment, the SDDC DS specification may be a file to transfer data as text, such as a JavaScript Object Notation (JSON) file.

Next, at step 208, in response to the instruction from the cloud-based service 110, an instruction with the SDDC DS specification to bootstrap the SDDC 104 is transmitted to the SDDC bootstrap service 140 running in one of the provisioned host computers from the SDDC worker 112. Since each of the provisioned host computers includes an SDDC bootstrap service, the instruction from the SDDC worker 112 can be sent to the SDDC bootstrap service of any of the provisioned host computers.

Next, at step 210, in response to the instruction from the SDDC worker 112, storage needed for the management components of the SDDC 104 being deployed is bootstrapped by the SDDC bootstrap service 140 using the SDDC DS specification. That is, storage resources that can be used by the management components of the SDDC being deployed is created by the SDDC bootstrap service 140. In an embodiment, creating the storage for the management components may involve creating a virtual storage cluster and claiming disks of the cluster for a virtual storage datastore to be able to deploy the management components in the datastore.

Next, at step 212, a network needed for the management components of the SDDC being deployed is bootstrapped by the SDDC bootstrap service 140 using the SDDC DS specification. That is, a network that can be used by the management components of the SDDC 104 is created by the SDDC bootstrap service 140. In an embodiment, creating the network for the management components may involve configuring a minimal networking configuration required on one or more hosts to be able to deploy and start management components. In a particular implementation, an unmanaged distributed virtual switch (DVS) is created in the host, and then vmk0 and vmnic0 in the host are migrated to the unmanaged DVS. A port group is then created on the unmanaged DVS for the management components to use.

Next, at step 214, the management components for the SDDC 104 are deployed by the SDDC bootstrap service 140 using the SDDC DS specification. That is, the management components of the SDDC being deployed, which are specified in the SDDC DS specification, are installed and executed to run on the provisioned host computers. In an embodiment, at least some of the management components are deployed as virtual machine appliances, which are virtual machines with management components running on the virtual machines. These virtual machine appliances may be deployed by downloading appropriate files, such as open virtualization appliance (OVA) files, using, for example, Hypertext Transfer Protocol Secure (HTTPS). Thus, in some embodiments, the SDDC DS specification includes specific Uniform Resource Locators (URLs) to retrieve the appropriate files. At this point in the SDDC deployment process, all the components of the SDDC are present.

Next, at step 216, an instruction with the SDDC DS specification to configure the SDDC 104 to a desired state is sent to the SDDC configuration service 146 in the cluster management center 144 from the SDDC bootstrap service 140.

Next, at step 218, using the SDDC DS specification, a request to configure the cluster of provisioned host computers in the SDDC 104 to a particular state is transmitted to the cluster management center 144 from the SDDC configuration service 146. In an embodiment, one or more API calls may be made to the cluster management center 144 to configure the host cluster. As an example, the configuration options for the host cluster may include, but not limited to, (a) management resource pool configuration, (b) CPU and memory reservations for the resource pools, (c) high availability (HA) policy configuration, (d) distributed resource scheduling settings, (e) software depository and desired software state setup, and (f) anti-affinity rules and virtual machine rules. In an embodiment, the cluster management center 144 may also be configured using the SDDC DS specification. As an example, the configurations for the cluster management center may include, but not limited to, (a) Single Sign-On (SSO) configuration, (b) hybrid linked mode capabilities, (c) users, (d) alarms, (e) permissions, (f) password policy, (g) license, (h) telemetry settings, (i) syslog, (j) network time protocol (NTP) and (k) domain name server (DNS). Next, at step 220, the cluster of provisioned host computers is configured by the cluster management center 144 to the requested state.

Next, at step 222, using the SDDC DS specification, a request to configure the logical overly networks in the SDDC 104 to a particular state is transmitted to the logical network manager 138 from the SDDC configuration service 146. If there are more than one logical network manager 138, any of the logical network managers may be selected to be the primary logical network manager. In an embodiment, one or more API calls may be made to the logical network manager 138 to configure the logical overly networks in the SDDC. As an example, the configuration options for the logical overlay networks may include, but not limited to, a) configurations for tier0 and tier1 logical routers, b) network for management virtual machines, c) logical switches for data migration (e.g., VMware vSphere® vMotion® technology) and virtual storage, and d) edge firewall for management virtual machines. Next, at step 224, the logical overly networks in the SDDC is configured by the logical network manager 138 to the requested state.

Next, at step 226, using the SDDC DS specification, a request to configure one of the provisioned host computers in the SDDC 104 to a particular state is transmitted to each hypervisor 134 from the SDDC configuration service 146. The particular state for each of the host computers may be the same or may be different from at least some of the host computers. In an embodiment, one or more API calls may be made to each hypervisor 134 to configure the corresponding host computer in the SDDC. As an example, the configuration options for a host computer may include, but not limited to, (a) virtual machine kernel NICs (vmknics) for data migration, virtual storage and host management, (b) syslog, (c) network time protocol (NTP), (d) domain name server (DNS), (e) disk configuration for virtual storage, (f) netstacks and g) license. Next, at step 228, the host computers in the SDDC 104 are configured by the hypervisors 134 to the requested state or states.

Next, at step 230, using the SDDC DS specification, a request to configure the virtual storage of the SDDC 104 to a particular state is transmitted to the virtual storage manager 142 from the SDDC configuration service 146. If the virtual storage of the SDDC is managed by the cluster management center 144, then the request is transmitted to the cluster management center. In an embodiment, one or more API calls may be made to the virtual storage manager 142 or the cluster management center 144 to configure the virtual storage of the SDDC. As an example, the configuration options for the virtual storage may include, but not limited to, (a) encryption, (b) deduplication, (c) compression, (d) license, (e) disk format version, (f) management datastore policy, and (g) storage profiles. Next, at step 232, the virtual storage of the SDDC is configured by the virtual storage manager 142 or the cluster management center 144 to the requested state.

Figure 4:
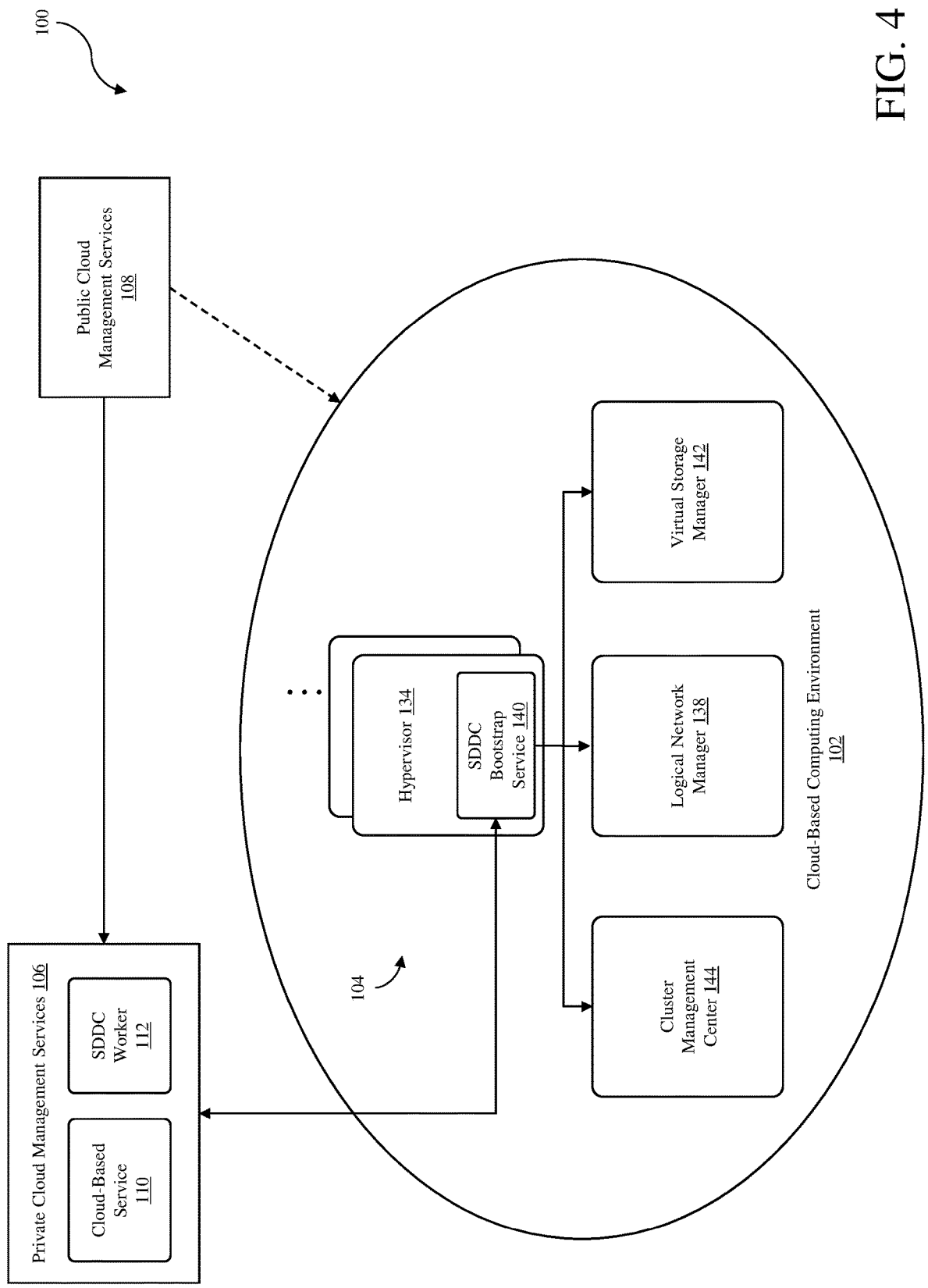
FIG. 4 illustrates the SDDC deployed in the target cloud-based computing environment using the SDDC bootstrap service in one of the hypervisors in the target cloud-based computing environment in accordance with an embodiment of the invention.

As a result, the SDDC 104 is deployed in the cloud-based computing environment 102 with the desired state, as illustrated in FIG. 4, which illustrates the main components of the SDDC 104 in the cloud-based computing environment 102. As noted above, the virtual storage manager 142 may be integrated into the cluster management center 144. In such an embodiment, the SDDC 104 would only include the cluster management center 144, not both the cluster management center 144 and the virtual storage manager 142.

Figure 5:
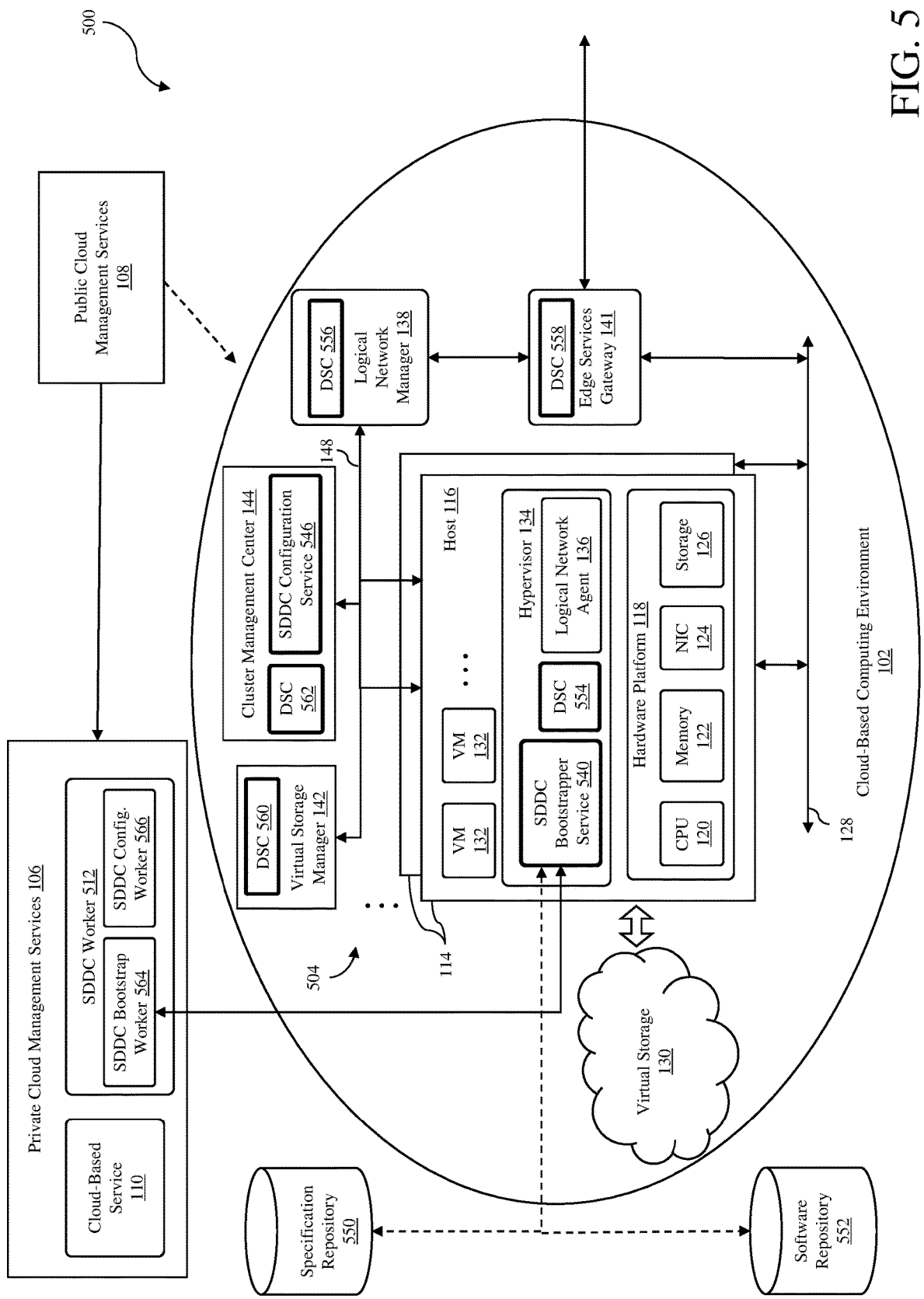
FIG. 5 is a block diagram of a computing system in accordance with another embodiment of the invention.

Turning now to FIG. 5, a computing system 500 in accordance with another embodiment of the invention is illustrated. The computing system 500 includes similar components as the computing system 100 shown in FIG. 1. However, the computing system 500 further includes a specification repository 550, which includes a number of specifications for different management components that are needed to deploy new SDDCs. The computing system 500 also includes a software repository 552, which includes a number of management component deployment files, e.g., OVAs, and bootstrap workflows. The management component deployment files are files that can be executed to deploy management components of an SDDC 504. In an embodiment, the management component deployment files are configured to deploy management components as virtual machine appliances. The bootstrap workflows are software that deliver runnable modules that implement SDDC bootstrapping sequences and workflows for different SDDCs. These modules may rely on the built-in primitives in the hypervisor, but may optionally include additional code/modules that can be used for the SDDC bootstrapping workflows. In an embodiment, the bootstrap workflows may be packaged as archive files, such as vSphere installation bundles (VIBs), to deliver them into the hypervisors.

The management component specifications stored in the specification repository 550 and the software stored in the software repository 552 are available for an SDDC bootstrap service 540 in each of the hypervisors 134. In general, the SDDC bootstrap service 540 executes bootstrap operations similar to the SDDC bootstrap service 140 shown in FIG. 1. However, the SDDC bootstrap service 540 includes components that perform different aspects of the bootstrap operations, which are shown in FIG. 6.

Figure 6:
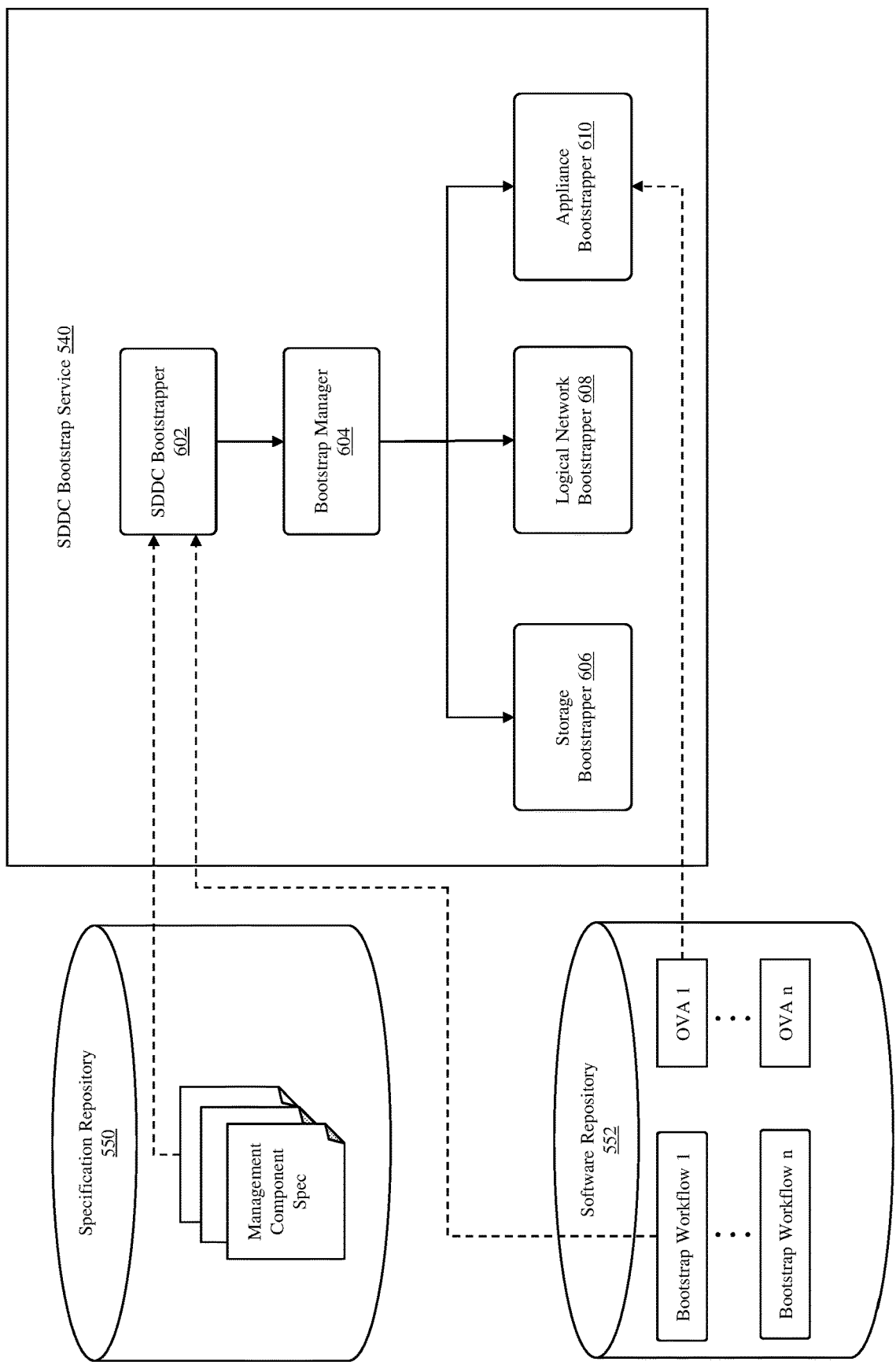
FIG. 6 shows components of an SDDC bootstrap service in the computing system depicted in FIG. 5 in accordance with another embodiment of the invention.

As shown in FIG. 6, the SDDC bootstrap service 540 includes an SDDC bootstrapper 602, a bootstrap manager 604, a storage bootstrapper 606, a logical network bootstrapper 608 and an appliance bootstrapper 610. The SDDC bootstrapper 602 initiates and manages an SDDC deployment process. The SDDC bootstrapper 602 may also initiates and manage a process to restore at least some of the management components in an SDDC 504 when needed, as described below. In this embodiment, in response to an SDDC deployment request, the SDDC bootstrapper 602 retrieves a number of management component specifications from the specification repository 550 and one of the bootstrap workflows from the software repository 552. The particular management component specifications and bootstrap workflow selected will depend on the requested SDDC with respect to type and configuration, as well as the target computing environment to deploy the requested SDDC. The retrieved management component specifications correspond to the different management components that are needed to create the new SDDC. These management component specifications are then aggregated to create a single SDDC DS specification that includes information specific to the type and configuration of the requested SDDC and the target computing environment. During the SDDC deployment process, the SDDC bootstrapper 602 leverages the bootstrap manager 604 to deploy management components of the requested SDDC with the necessary storage and network resources available for the deployed management.

In an embodiment, the bootstrap manager 604 operates to parse the SDDC DS specification to separate the information contained in the SDDC DS specification with respect to storage and network needed by the management components prior to their deployment in the target computing system. The parsed information from the SDDC DS specification with respect to the storage needed by the management components is transmitted to the storage bootstrapper 606, which bootstraps the storage needed by the management components. Similarly, the parsed information from the SDDC DS specification with respect to the network needed by the management components is transmitted to the logical network bootstrapper 608, which bootstraps the network needed by the management components. Furthermore, the parsed information from the SDDC DS specification with respect to the management components to be deployed is transmitted to the appliance bootstrapper 610, which deploys the management components in the target computing environment, e.g., the cloud-based computing environment 102. In an embodiment, the management components are deployed by downloading the management component deployment files, e.g., OVAs, from the software repository using, for example, URLs that point to the particular management component deployment files. These components of the SDDC bootstrap service 540 will be described in more detail below.

Figure 7:
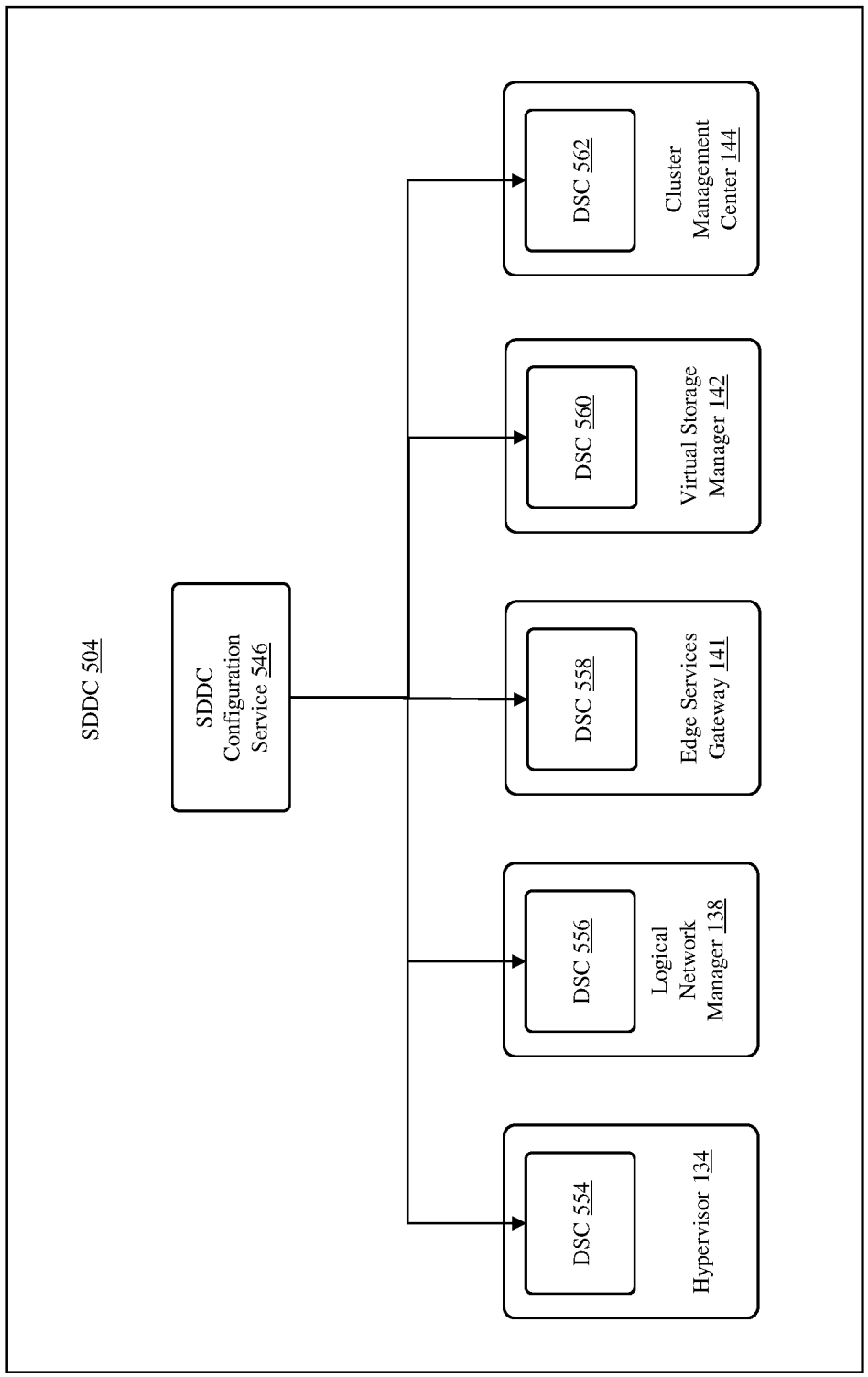
FIG. 7 is a block diagram of an SDDC configuration service and different components with desired state controllers (DSCs) of an SDDC in the computing system shown in FIG. 5 in accordance with another embodiment of the invention.

Turning back to FIG. 5, in this embodiment, the hypervisors 134, the logical network manager 138, the edge services gateway 141, the virtual storage manager 142 and the cluster management center 144 include desired state controllers (DSCs) 554, 556, 558, 560 and 562, respectively. These DSCs are built into the respective components. In an embodiment, some of these DSCs expose APIs that are able to configure the SDDC to the desired state via their respective components. These APIs may be used to set one or more desired configurations of the SDDC. Each DSC operates to configure one or more aspects of the SDDC that are controlled by its respective component by receiving an appropriate portion of the SDDC DS specification. These portions of the SDDC DS specification are provided to the DSCs by an SDDC configuration service 546, as illustrated in FIG. 7, which shows different DSCs of the management components.

In this embodiment, the SDDC configuration service 546 receives the SDDC DS specification from an SDDC worker 512, which is part of the private cloud management services 106. The SDDC configuration service 546 then orchestrates between the different DSCs 554-562 by parsing the SDDC DS specification into the appropriate portions, passing to the DSCs their respective portions of the SDDC DS specification, sequencing the desired state applications and monitoring their progress.

In this embodiment, the SDDC worker 512 includes an SDDC bootstrap worker 564 and an SDDC configuration worker 566, which are running as part of the private cloud management services 106. The SDDC bootstrap worker 564 is configured to communicate with the hypervisor 134 in one of the hosts 116 to bootstrap the SDDC during the SDDC deployment process. The SDDC configuration worker 566 is configured to communicate with the different DSCs 554-562 in the hypervisors 134, the logical network manager 138, the edge services gateway 141, the virtual storage manager 142 and the cluster management center 144 to configure the newly created SDDC to the desired state.

A process of deploying a new SDDC in the computing system 500 in accordance with an embodiment of the invention is described with reference to flow diagrams of FIGS. 8A and 8B. The SDDC deployment process will be described in terms of two stages. The first stage of the SDDC deployment process is the SDDC bootstrap stage, where the SDDC is created, which is illustrated by the flow diagram of FIG. 8A. The second stage of the SDDC deployment process is the SDDC configuration stage, where the newly created SDDC is configured, which is illustrated by the flow diagram of FIG. 8B.

The SDDC deployment process is initiated in response to user input requesting the new SDDC to be deployed. In an embodiment, the user input may be received at the cloud-based service 110 via a GUI, which may be provided by a web-based application or by an application running on a computer system that can access the cloud-based service 110. In an embodiment, the user input for creating the SDDC 504 may include, but not limited to, the name of the SDDC to be created, the number of host computers for the SDDC, and network Classless Inter-Domain Routing (CIDR) range.

Figure 8A:
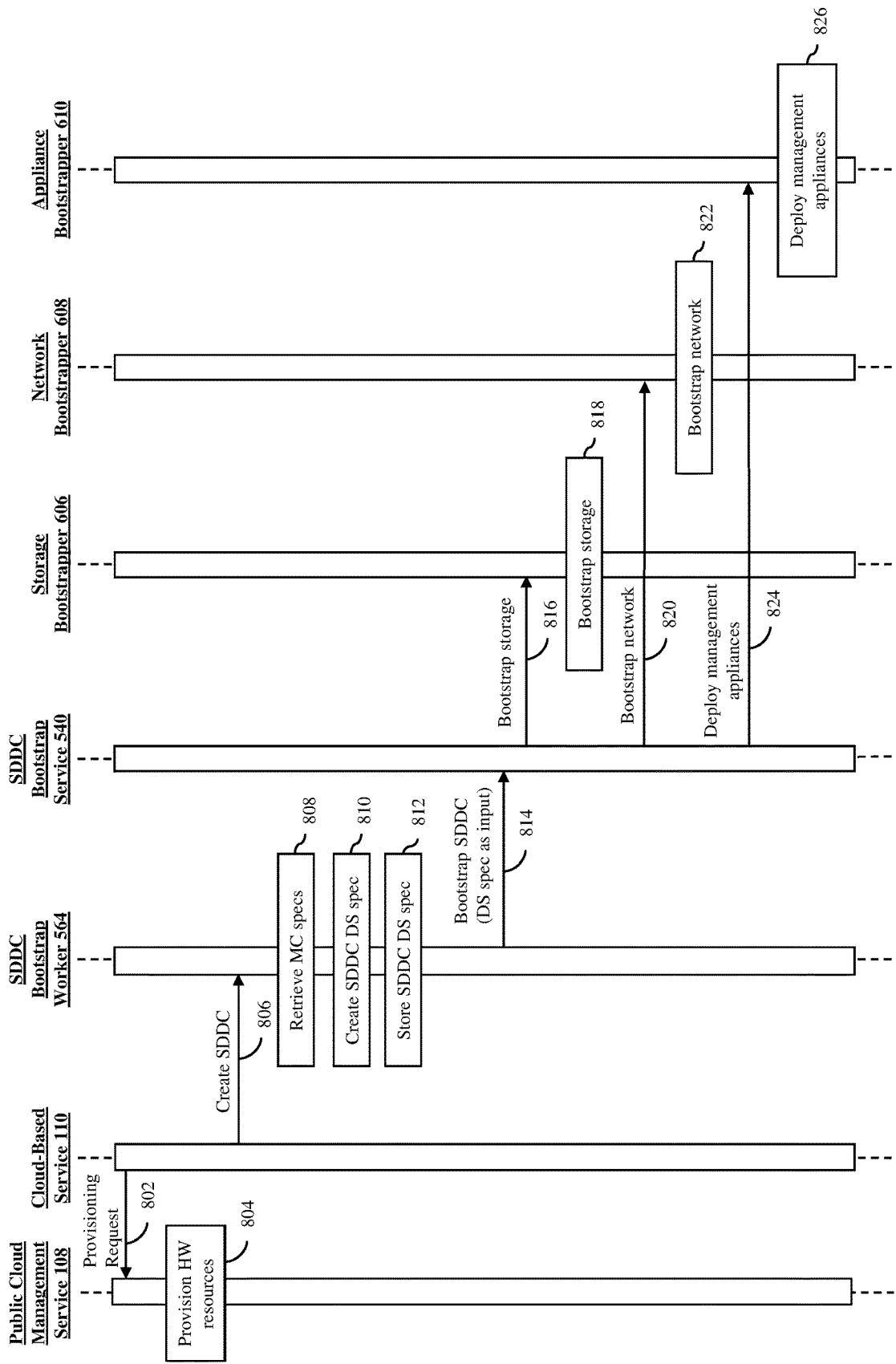
FIGS. 8A and 8B show flow diagrams of a process of deploying a new SDDC in the computing system shown in FIG. 5 in accordance with an embodiment of the invention.

As shown in FIG. 8A, the SDDC bootstrap stage of the SDDC deployment process starts at step 802, where in response to the received user request, a provisioning request is sent to the public cloud management services 108 from the cloud-based service 110 for hardware resources, e.g., host computers, for the SDDC 504 to be deployed. In some embodiments, a new cloud-based computing environment may be created and defined with the hardware resources. However, in other embodiments, the hardware resources may be added to an existing cloud-based computing environment.

Next, at step 804, in response to the provisioning request, the hardware resources that are requested are provisioned in the target cloud-based computing environment, which may already exist or may be created as part of the provisioning task. In some embodiments, the provisioned host computers may include host virtualization software, e.g., a hypervisor, already installed. In other embodiments, the host virtualization software may need to be installed in the provisioned host computers under the direction of the cloud-based service 110.

Next, at step 806, an instruction to create an SDDC is transmitted to the SDDC bootstrap worker 564 from the cloud-based service 110. Next, at step 808, in response to the instruction from the cloud-based service 110, a number of management component (MC) specifications are retrieved from the specification repository 550 by the SDDC bootstrap worker 564 for the management components needed for the requested SDDC. In addition, a particular bootstrap workflow may also be downloaded from the specification repository 550 by the SDDC bootstrap worker 564. In an embodiment, the particular management component specifications and bootstrap workflow are selected based on the type and configuration of the SDDC being requested and the target computing environment in which the SDDC is to be deployed.

Next, at step 810, using the retrieved management component specifications, an SDDC DS specification is created by the SDDC bootstrap worker 564 by aggregating the management component specifications. After the SDDC DS specification has been created, the SDDC DS specification is uploaded to the specification repository 550 by the SDDC bootstrap worker 564, at step 812, so that the SDDC DS specification can be used at a later time when needed for, such as, configuring the SDDC to a desired state or auditing the SDDC deployment process.

Next, at step 814, an instruction with the SDDC DS specification is transmitted to the SDDC bootstrap service 540 running in one of the provisioned host computers from the SDDC bootstrap worker 564. Since each of the provisioned host computers include an SDDC bootstrap service 540, the instruction from the SDDC bootstrap worker 564 can be sent to the SDDC bootstrap service of any of the host computers.

Next, at step 816, in response to the instruction from the SDDC bootstrap worker 564, a request to bootstrap storage that is needed by the management components of the SDDC 504 being deployed (e.g., the logical network manager 138, the edge services gateway 141, the virtual storage manager 142 and the cluster management center 144) is transmitted to the storage bootstrapper 606 from the SDDC bootstrap service 540. In an embodiment, the bootstrap storage request includes storage information needed to create a datastore that can be used for the management components of the SDDC being deployed.

Next, at step 818, in response to the request from the SDDC bootstrap service 540, the storage needed by the management components of the SDDC to be deployed is bootstrapped by the storage bootstrapper 606. That is, storage resources that can be used by the management component of the SDDC being deployed is created by the storage bootstrapper 606. In an embodiment, a virtual storage datastore is created for the management components of the SDDC using the physical storage resources of the provisioned host computers.

Next, at step 820, a request to bootstrap network that is needed by the management components of the SDDC to be deployed is transmitted to the logical network bootstrapper 608 from the SDDC bootstrap service 540. The bootstrap network request includes network information needed to create the network for the management components of the SDDC being deployed.

Next, at step 822, in response to the request from the SDDC bootstrap service 540, the network needed by the management components of the SDDC to be deployed is bootstrapped by the logical network bootstrapper 608. That is, a network that can be used by the management component of the SDDC 504 is created by the logical network bootstrapper 608.

Next, at step 824, a request to deploy the management components of the SDDC is transmitted to the appliance bootstrapper 610 from the SDDC bootstrap service 540. The bootstrap management component request includes information needed to deploy the specific management components of the SDDC being deployed.

Next, at step 826, in response to the request to deploy the management components from the SDDC bootstrap service 540, the management components of the SDDC are deployed by the appliance bootstrapper 610 using necessary software from the software repository 552. That is, the management components are downloaded from the software repository 552 and executed to run on the provisioned host computers. In an embodiment, the management components are deployed as virtual machine appliances, which are virtual machines with management components running on the virtual machines. In this embodiment, archive files for the required management components are retrieved from the software repository 552 via HTTP using URLs. The SDDC bootstrap stage of the SDDC deployment process is now complete.

Figure 8B:
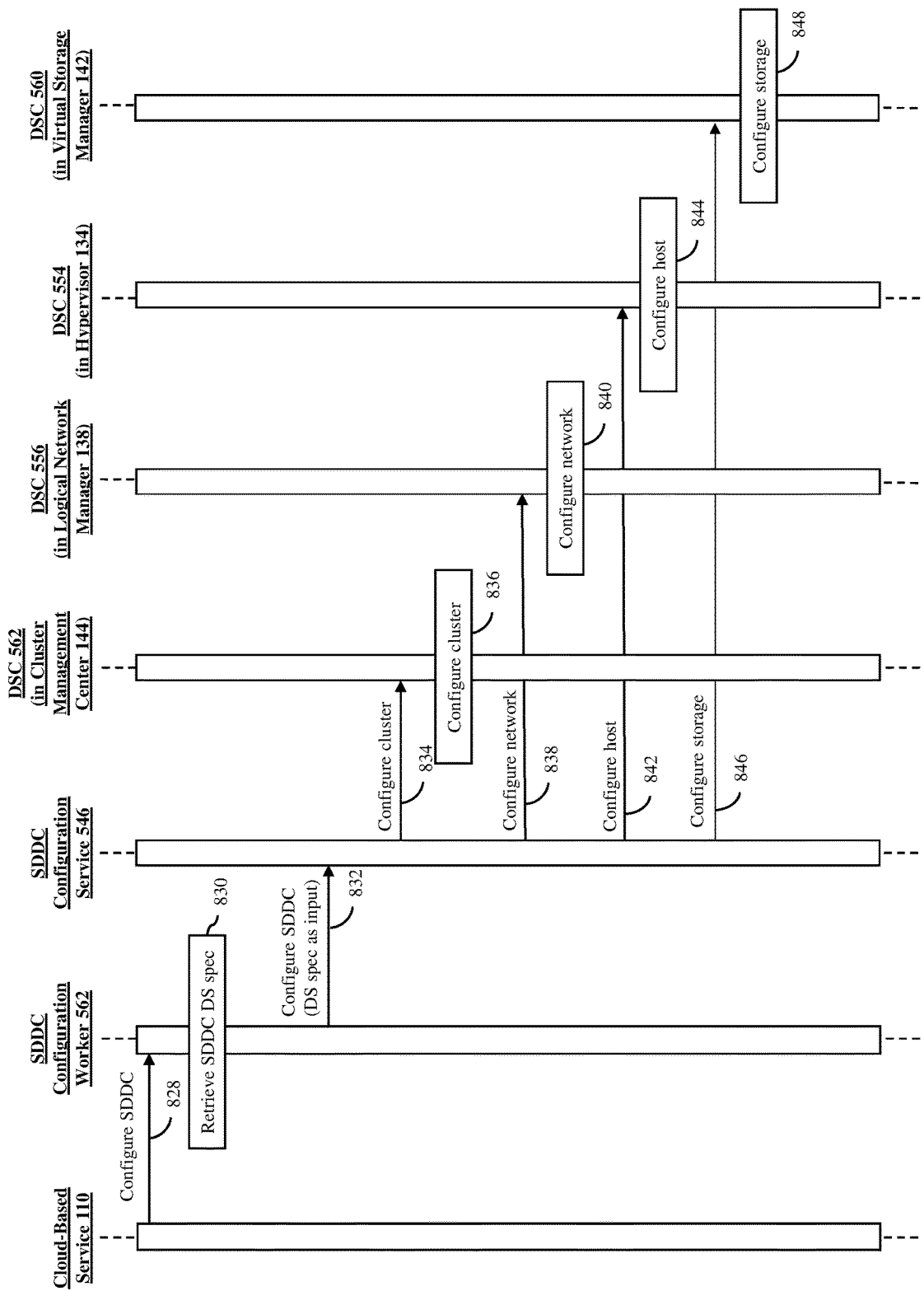

As shown in FIG. 8B, the SDDC configuration stage of the SDDC deployment process starts at step 828, where a request to configure the SDDC 504 is sent to the SDDC configuration worker 566 from the cloud-based service 110.

Next, at step 830, in response to the request from the cloud-based service 110, the SDDC DS specification for the SDDC 504 is retrieved from the specification repository 550 by the SDDC configuration worker 566. In some embodiments, the SDDC DS specification may be provided to the SDDC configuration worker 566 from the SDDC bootstrap worker 564.

Next, at step 832, an instruction with the SDDC DS specification to configure the SDDC 504 is sent to the SDDC configuration service 546 in the cluster management center 144 from the SDDC configuration worker 566.

Next, at step 834, in response to the SDDC configure request, a request to configure the cluster 114 of hosts 116 supported by the cluster management center 144 to a particular desired state is sent to the DSC 562 of the cluster management center 144 from the SDDC configuration service 546. In an embodiment, the request to the DSC 562 of the cluster management center 144 includes a portion of the SDDC DS specification that contain information of the configurations needed to set the host cluster 114 to the particular desired state. These host cluster configurations may be similar to the host cluster configurations described above with respect to the computing system 100.

Next, at step 836, in response to the cluster configure request, the cluster 114 in the SDDC 504 is configured to the desired state by the DSC 562 of the cluster management center 144. In an embodiment, one or more API calls may be made to the cluster management center 144 to configure the host cluster 114.

Next, at step 838, a request to configure the logical overlay networks in the SDDC 504 to a particular desired state is sent to the DSC 556 of the logical network manager 138 from the SDDC configuration service 546. In an embodiment, the request to the DSC 562 of the cluster management center 144 includes a portion of the SDDC DS specification that contain information of the configurations needed to set the logical overlay networks to the particular desired state. These logical overlay network configurations may be similar to the logical overlay network configurations described above with respect to the computing system 100.

Next, at step 840, in response to the logical network configure request, the logical network in the SDDC 504 is configured to the desired state by the DSC 556 of the logical network manager 138. In an embodiment, one or more API calls may be made to the logical network manager 138 to configure the logical overly networks in the SDDC 504.

Next, at step 842, a request to configure the host computer in the SDDC 504 to a particular desired state is sent to the DSC 554 of the hypervisor 134 in each of the hosts 116 from the SDDC configuration service 546. In an embodiment, each request to the DSC 554 of the hypervisor 134 includes a portion of the SDDC DS specification that contain information of the configurations needed to set the respective host to the particular desired state. These host configurations may be similar to the host configurations described above with respect to the computing system 100.

Next, at step 844, in response to the host configure request, each host 116 in the SDDC 504 is configured to the desired state by the DSC 554 of the hypervisor 134 in that host. In an embodiment, one or more API calls may be made to each hypervisor 134 to configure the corresponding host in the SDDC 504.

Next, at step 846, a request to configure the virtual storage 130 in the SDDC 504 to a particular desired state is sent to the DSC 560 of the virtual storage manager 142 from the SDDC configuration service 546. In an embodiment, the request to the DSC 560 of the virtual storage manager 142 includes a portion of the SDDC DS specification that contain information of the configurations needed to set the virtual storage 130 to the particular desired state. These virtual storage configurations may be similar to the virtual storage configurations described above with respect to the computing system 100.

Next, at step 848, in response to the virtual storage configure request, the virtual storage 130 in the SDDC 504 is configured to the desired state by the DSC 560 of the virtual storage manager 142. If the virtual storage of the SDDC 504 is managed by the cluster management center 144, then the request is transmitted to the cluster management center. In an embodiment, one or more API calls may be made to the virtual storage manager 142 or the cluster management center 144 to configure the virtual storage 130 of the SDDC 504. The SDDC configuration stage of the SDDC deployment process is now complete, and the SDDC deployment process comes to an end.

Figure 9:
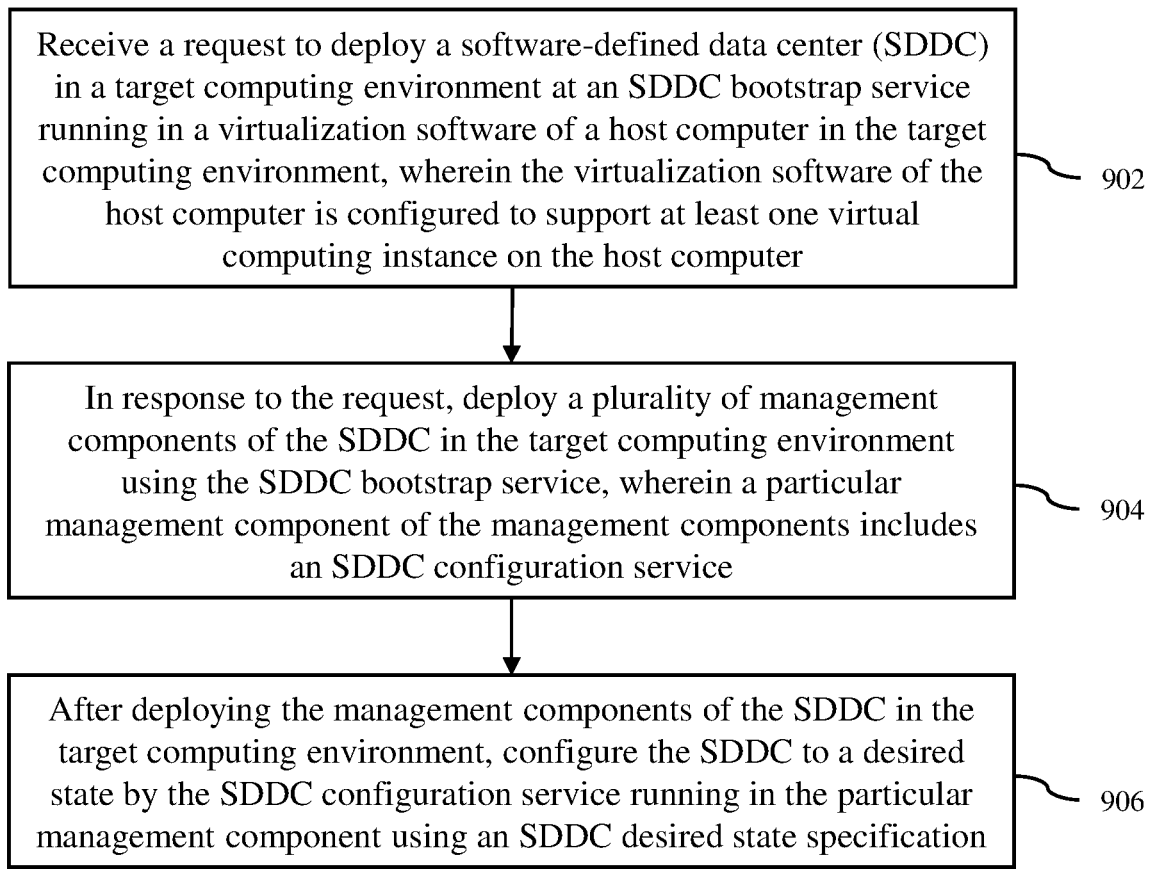
FIG. 9 is a flow diagram of a computer-implemented method for deploying software-defined data centers (SDDCs) in target computing environments in accordance with an embodiment of the invention.

A computer-implemented method for deploying software-defined data centers (SDDCs) in target computing environments in accordance with an embodiment of the invention is described with reference to a flow diagram of FIG. 9. At block 902, a request to deploy a software-defined data center (SDDC) in a target computing environment is received at an SDDC bootstrap service running in a virtualization software of a host computer in the target computing environment. The virtualization software of the host computer is configured to support at least one virtual computing instance on the host computer. At block 904, in response to the request, a plurality of management components of the SDDC is deployed in the target computing environment using the SDDC bootstrap service. An SDDC configuration service is included in a particular management component of the management components. At block 906, after deploying the management components of the SDDC in the target computing environment, the SDDC is configured to a desired state by the SDDC configuration service running in the particular management component using a desired state SDDC specification.

Figure 10:
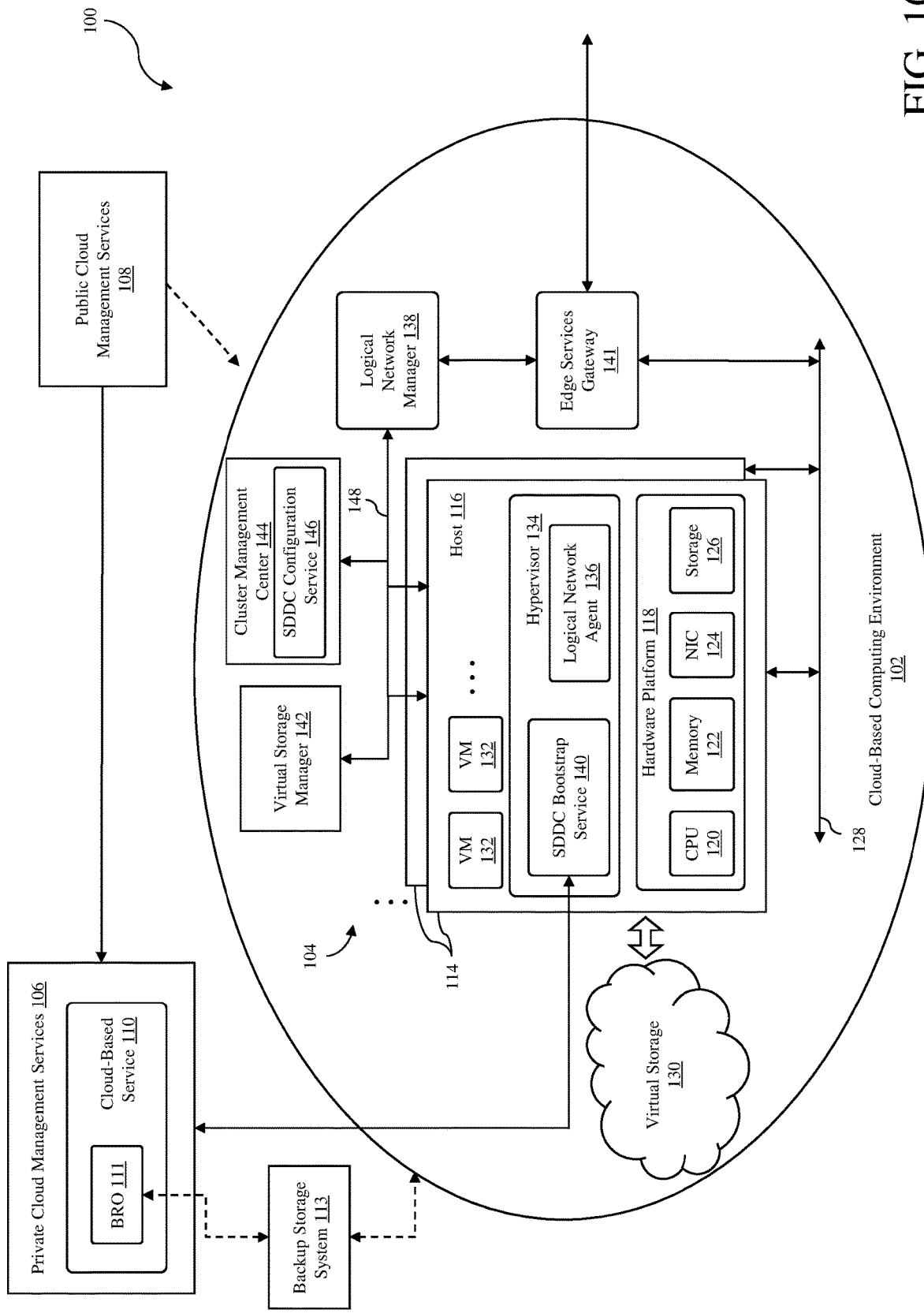
FIG. 10 is a block diagram of the computing system shown in FIG. 1 that is capable of restoring SDDC management components using the SDDC bootstrap service in accordance with another embodiment of the invention.

In some embodiments, the SDDC bootstrap service 140 or 540 may be configured to restore one or more management components of an SDDC, such as the SDDC 104 or 504. Turning now to FIG. 10, the computing system 100 shown in FIG. 1 that is capable of restoring SDDC management components using the SDDC bootstrap service is illustrated with the addition of a backup and restore orchestrator (BRO) 111 in the cloud-based service 110, which manages backup operations for various components in the SDDC 104, including management components, using a backup storage system 113, in accordance with another embodiment of the invention. The backup storage system 113 is used to store backup configuration data for various components in the cloud-based computing environment 102, including components in the SDDC 104. The backup storage system 113 can be any known backup system that can provide backup services under the direction of the BRO 111. The BRO 111 is described in more detail below. In FIG. 10, the SDDC worker 112 in the private cloud management services 106 is not shown.

Unlike conventional restore solutions that require an external service outside of an SDDN that includes one or more management components to be restored, the restore solution in accordance with embodiments of the invention uses the SDDC bootstrap service 140 in the hypervisor 134 of one of the hosts 116 to restore one or more target management components in the SDDC 104. Thus, additional resources that are required for the external service are no longer needed. In addition, new software that may be required for administrators to run the external service is eliminated. Rather, the SDDC management component restore solution in accordance with embodiments of the invention uses the SDDC bootstrap service 140 that exists in the hypervisor 134 to restore one or more management components of the SDDC 104, as explained in detail below.

In some situations, the cluster management center (CMC) 144 of the SDDC 104 in the computing system 100 may need to be restored. A process of restoring the CMC 144 of the SDDC 104 in accordance with an embodiment of the invention is described with reference to a flow diagram of FIGS. 11A and 11B. The restoring of the CMC 144 of the SDDC 104 is initiated in response one of a number of triggering events, which may be one or more failures in the SDDC. These triggering events may include a failure of the CMC 144 or a failure of one or more SDDC functions or features provided by the CMC.

Figure 11A:
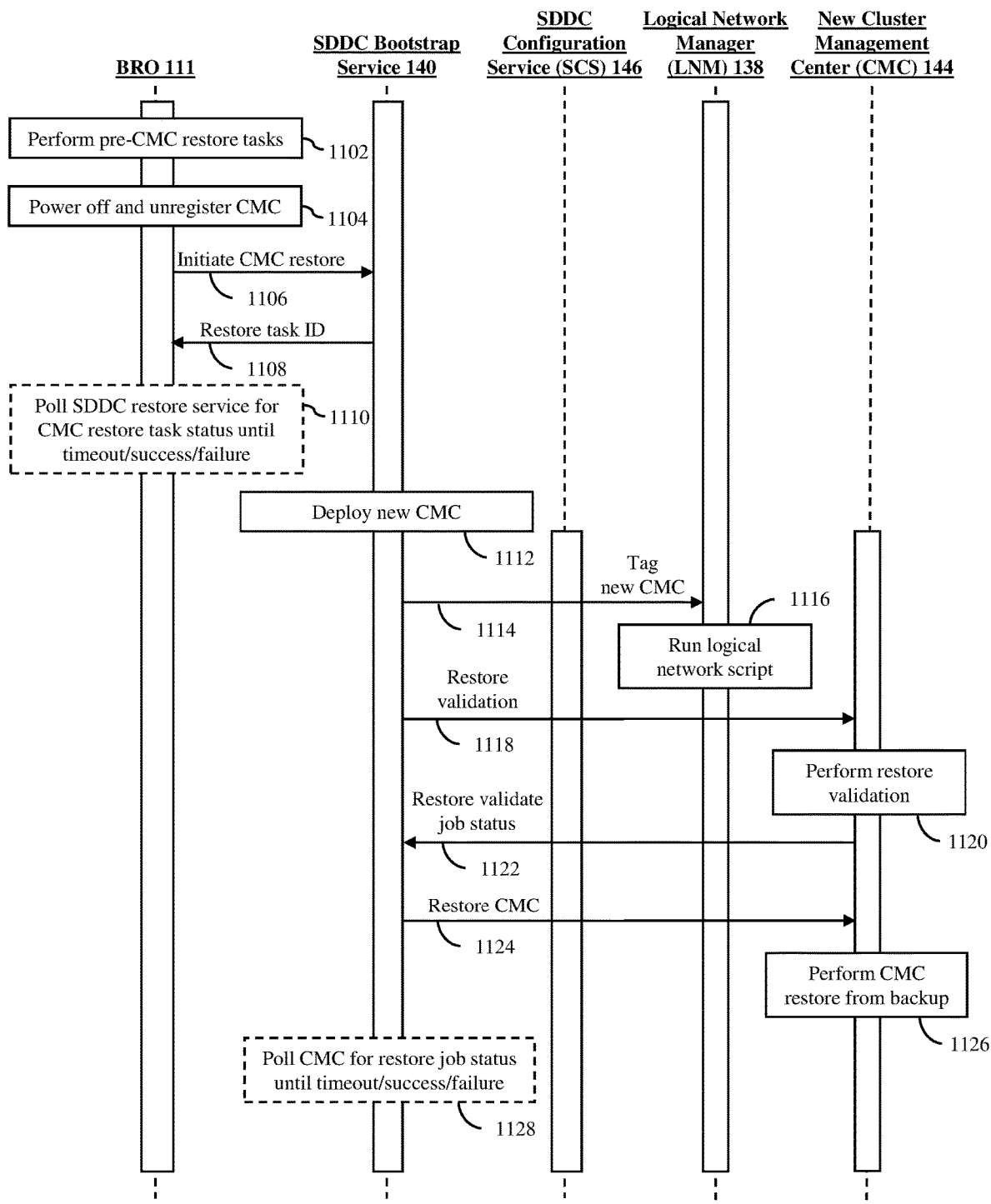
FIGS. 11A and 11B show a flow diagram of a process of restoring a cluster management center in an SDDC in the computing system shown in FIG. 10 in accordance with an embodiment of the invention.
Figure 11B:
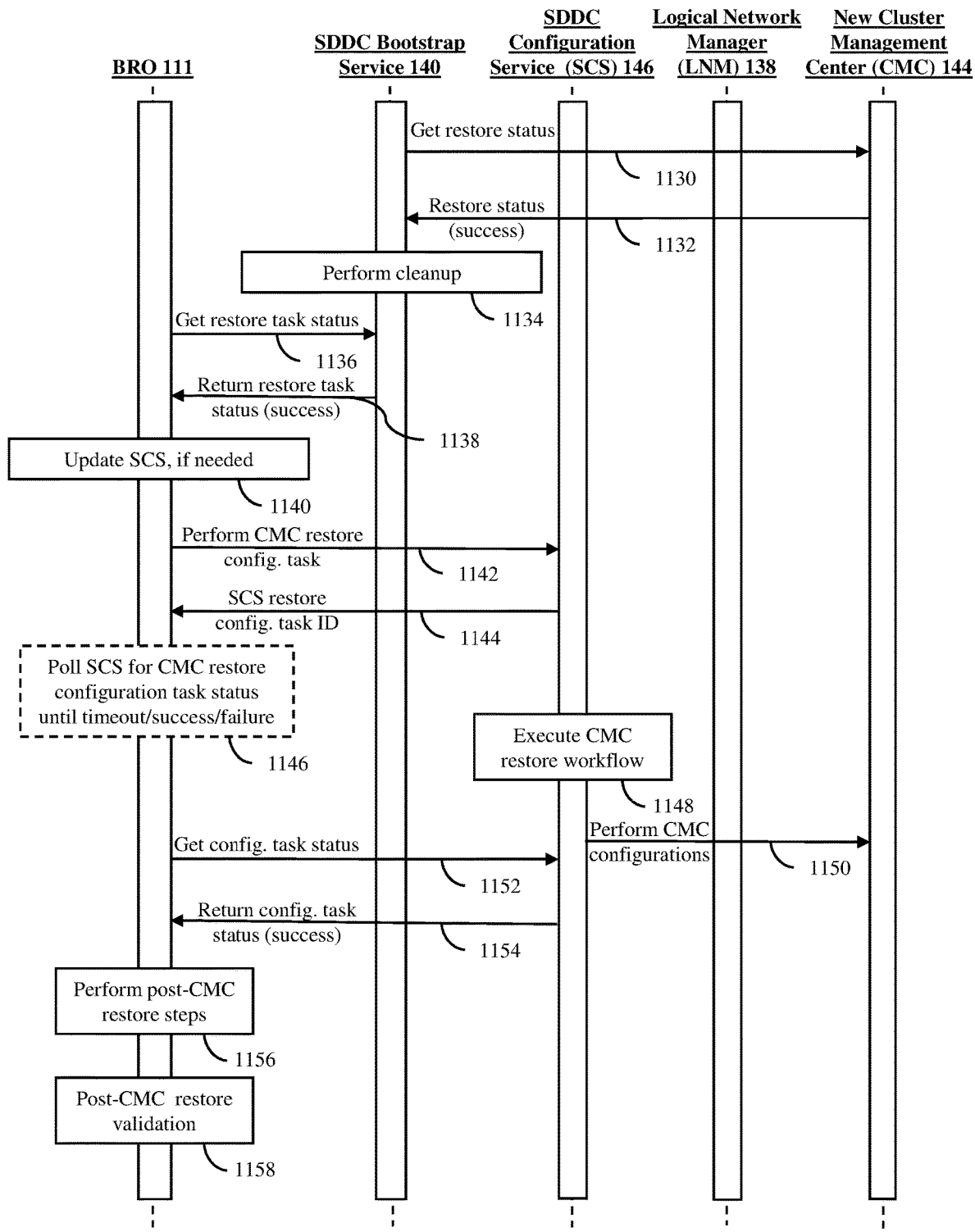

As shown in FIG. 11A, the process of restoring the cluster management center (CMC) 144 begins at step 1102, where, in response to one or more triggering events, pre-CMC restore tasks are executed by the BRO 111. As an example, the pre-CMC restore tasks may include, but not limited to, (a) ensure that the path to download a management component deployment file for a new CMC 144 is provided in a backup specification and is accessible from any of the hosts 116 in the SDDC 104, (b) select and prepare one of the hosts 116 in the SDDC 104 to deploy the new CMC in the SDDC 104, and (c) setup the network needed for the new CMC.

Next, at step 1104, the existing CMC 144 in the SDDC 104 is powered off and unregistered from a registration database by the BRO 111. The registration database includes registrations of components in the SDDC 104, including the management components, such as the CMC 144, and information regarding the registered components. In another embodiment, the existing CMC 144 may be powered off and unregistered from the registration database at a later time by the SDDC bootstrap service 140.

Next, at step 1106, a request to initiate a CMC restore task is sent to the SDDC bootstrap service 140, which is in the hypervisor 134 of the selected host 116 in the SDDC 104, from the BRO 111. The request includes the backup specification, which includes the path to download a management component deployment file for a new CMC and other information to deploy and restore the CMC 144. In an embodiment, the backup specification may be similar to a CMC specification for deploying a new SDDC, as described herein.

Since each of the hosts include an SDDC bootstrap service, the request to initiate a CMC restore task from the BRO 111 can be sent to the SDDC bootstrap service 140 in any of the hosts 116 in the cluster 114. Next, at step 1108, in response to the request to initiate a CMC restore task, a restore task identification (ID) is generated and sent to the BRO 111 by the SDDC bootstrap service 140.

After receiving the restore task ID, the SDDC bootstrap service 140 is periodically polled for a CMC restore task status by the BRO 111 until the task status indicates timeout, success or failure, as illustrated by the block 1110. If there is timeout or failure, one or more attempts may be made to complete the CMC restore task. Alternatively, the CMC restore process may be aborted in response to timeout or failure notification.

Next, at step 1112, a new CMC 144 is deployed in the SDDC 104 by the SDDC bootstrap service 140 using a management component deployment file, which is a file or an archive file that can be used to deploy a CMC. That is, the new CMC 144 is installed and executed to run on the selected host 116 in the SDDC 104 using the management component deployment file, which may be downloaded from a predefined location by the SDDC bootstrap service 140, as specified in the backup specification. The deployment of the new CMC 144 can be executed using any known method to deploy such a management component in an existing SDDC. In an embodiment, the new CMC 144 is deployed as a virtual machine appliance, which is a virtual machine with a management component (e.g., a CMC) in running on the virtual machine. The CMC virtual machine appliance may be deployed by downloading one or more appropriate files, such as an open virtualization appliance (OVA) file, using, for example, Hypertext Transfer Protocol Secure (HTTPS), as specified in the backup specification, which includes all the information needed to deploy the new CMC 144, including the location of the appropriate management component deployment file, such as a Uniform Resource Locator (URL). In other embodiments, the request to initiate the CMC restore task may include the location of the appropriate management component deployment file to download the file needed to deploy the new CMC in the SDDC 104.

Next, at step 1114, an instruction is sent to the logical network manager 138 of the SDDC 104 from the SDDC bootstrap service 140 to tag the new CMC 144. Next, at step 1116, in response to the instruction from the SDDC bootstrap service 140, a logical network script is executed by the logical network manager 138. In an embodiment, when the logical network script is executed, the new CMC 144 is tagged to let the logical network manager 138 know that the new CMC is a management component, e.g., a management virtual machine, and that the logical network manager needs to update the underlying routes whenever management migration operations, e.g., VMware vSphere® vMotion® operations, are executed by the new CMC.

Next, at step 1118, a request to execute a restore validation is sent to the new CMC 144 from the SDDC bootstrap service 140. In an embodiment, the request, which may be an API call, includes at least the location of the latest backup configuration data needed to restore the new CMC 144 to a backup state of the previous CMC (when the latest backup configuration data was created) and the credentials needed to access the server in the backup storage system 113 on which the backup configuration data is stored. Next, at step 1120, a restore validation is performed by the new CMC 144. In an embodiment, the restore validation involves checking to see if the location of the backup configuration data for restore is valid and whether the backup configuration data includes all the files needed to properly execute a CMC restore operation to the backup state of the CMC when the backup configuration data was created. Next, at step 1122, after the restore validation has been successfully performed, a restore validate job status is sent to the SDDC bootstrap service 140 from the CMC 144 to notify that the restore validation has been successfully completed.

Next, at step 1124, an instruction to execute a CMC restore operation is sent to the CMC 144 from the SDDC bootstrap service 140. Next, at step 1126, the CMC restore operation is performed by the new CMC 144 using the latest backup configuration data of the previous CMC. In an embodiment, the CMC restore operation involves rebooting the new CMC 144 and configuring the services in the new CMC using the configurations in the backup configuration data.

After the instruction to execute a CMC restore operation is sent, the CMC 144 is periodically polled for a CMC restore job status by the SDDC bootstrap service 140 until the job status indicates timeout, success or failure, as illustrated by block 1128.

Next, at step 1130, a request is made to the new CMC 144 by the SDDC bootstrap service 140 for a CMC restore job status, as part of the polling procedure being performed by the SDDC bootstrap service. Next, at step 1132, a CMC restore job status is sent to the SDDC bootstrap service 140 by the CMC 144. If the CMC restore job status indicates that the CMC restore job has been successfully performed, the process proceeds to step 1134. However, if the CMC restore job status indicates timeout or failure, another attempt may be made to successfully execute the CMC restore job. Alternatively, the entire CMC restore process may be aborted in response to timeout or failure notification.

Next, at step 1134, a cleanup operation is performed by the SDDC bootstrap service 140. The cleanup operation involves removing and replacing any references to the old CMC with references to the new restored CMC 144 in the SDDC 104. Next, at step 1136, a request is made to the SDDC bootstrap service 140 by the BRO 111 for a CMC restore task status, as part of the polling procedure being performed by the BRO.

Next, at step 1138, a CMC restore task status is sent to the BRO 111 by the SDDC bootstrap service 140. If the CMC restore task status indicates that the CMC restore task has been successfully performed, the process proceeds to step 1140. However, if the CMC restore task status indicates timeout or failure, another attempt may be made to restore the CMC. Alternatively, the CMC restore process may be aborted in response to timeout or failure notification.

Next, at step 1140, if the SDDC configuration service (SCS) 146 needs to be updated, the SCS 146 is updated by the BRO 111. The determination of whether or not the SCS 146 in the SDDC 104 needs to be updated is made by the BRO 111, for example, by checking the version of the current SCS 146 in the SDDC 104 and updating the SCS to a new version, if there is one.

Next, at step 1142, an instruction to perform a CMC restore configuration task is sent to the SCS 146 from the BRO 111. Next, at step 1144, in response to the instruction to perform a CMC restore configuration task, a CMC restore configuration task ID is generated and sent to the BRO 111 by the SCS 146.

After receiving the CMC restore configuration task ID, the SCS 146 is periodically polled for a CMC restore configuration task status by the BRO 111 until the task status indicates timeout, success or failure, as illustrated by the block 1146. If there is timeout or failure, one or more attempts may be made to complete the CMC restore configuration task. Alternatively, the CMC restore process may be aborted in response to timeout or failure notification.

Next, at step 1148, a CMC restore workflow is executed by the SCS 146. In an embodiment, the CMC restore workflow may involve (a) removing the previous CMC from a CMC inventory, which may be maintained by the SCS 146 or another entity, (b) changing the name of the new CMC 144 from a temporary name, e.g., "CMC-restored" to an established name for a CMC of an SDDC, e.g., "CMC", and (c) moving the new CMC virtual machine to a management resource pool and a management virtual machine folder. As part of the CMC restore workflow, the new CMC 144 is configured by the SCS 146, as illustrated by step 1150. In an embodiment, the following tasks are executed to configure the new CMC: (a) reconfigure the CMC virtual machine to use a default storage profile, (b) set the restart priority for the CMC virtual machine to the highest priority, (c) set the CPU and memory reservations for the CMC virtual machine, and (d) configuring network time protocol (NTP).

Next, at step 1152, a request is made to the SCS 146 by the BRO 111 for a CMC restore configuration task status, as part of the polling procedure being performed by the BRO 111. Next, at step 1154, a CMC restore configuration task status is sent to the BRO 111 by the SCS 146. If the CMC restore configuration task status indicates that the CMC restore configuration task has been successfully performed, the process proceeds to step 1156. However, if the CMC restore configuration task status indicates timeout or failure, another attempt may be made to configure the CMC 144. Alternatively, the CMC restore process may be aborted in response to timeout or failure notification.

Next, at step 1156, one or more post-CMC restore steps are performed by the BRO 111. The post-CMC restore steps may include at least configuring the new CMC 144 to be backed up periodically, e.g., every 24 hours, and the resulting backup configuration data to be stored in the backup storage system 113. Next, at step 1158, a post-CMC restore validation is performed by the BRO 111. The post-CMC restore validation involves verifying whether the new CMC 144 is operating properly.

In some situations, the logical network (LN) of the SDDC 104 may need to be restored, which may involve restoring the logical network manager (LNM) 138 and any associated logical network management components, such as one or more other LNMs and one or more edge service gateways 141. A process of restoring the logical network of the SDDC 104 in accordance with an embodiment of the invention is described with reference to a flow diagram of FIGS. 12A and 12B. The restoring of the logical network of the SDDC 104 is initiated in response to one of a number of triggering events, which may be one or more failures in the SDDC. These triggering events may include a failure of one or more logical network management components, such as the LNM 138 and the edge services gateway 141, or a failure of one or more logical network functions or features supported by the logical network management components.

Figure 12A:
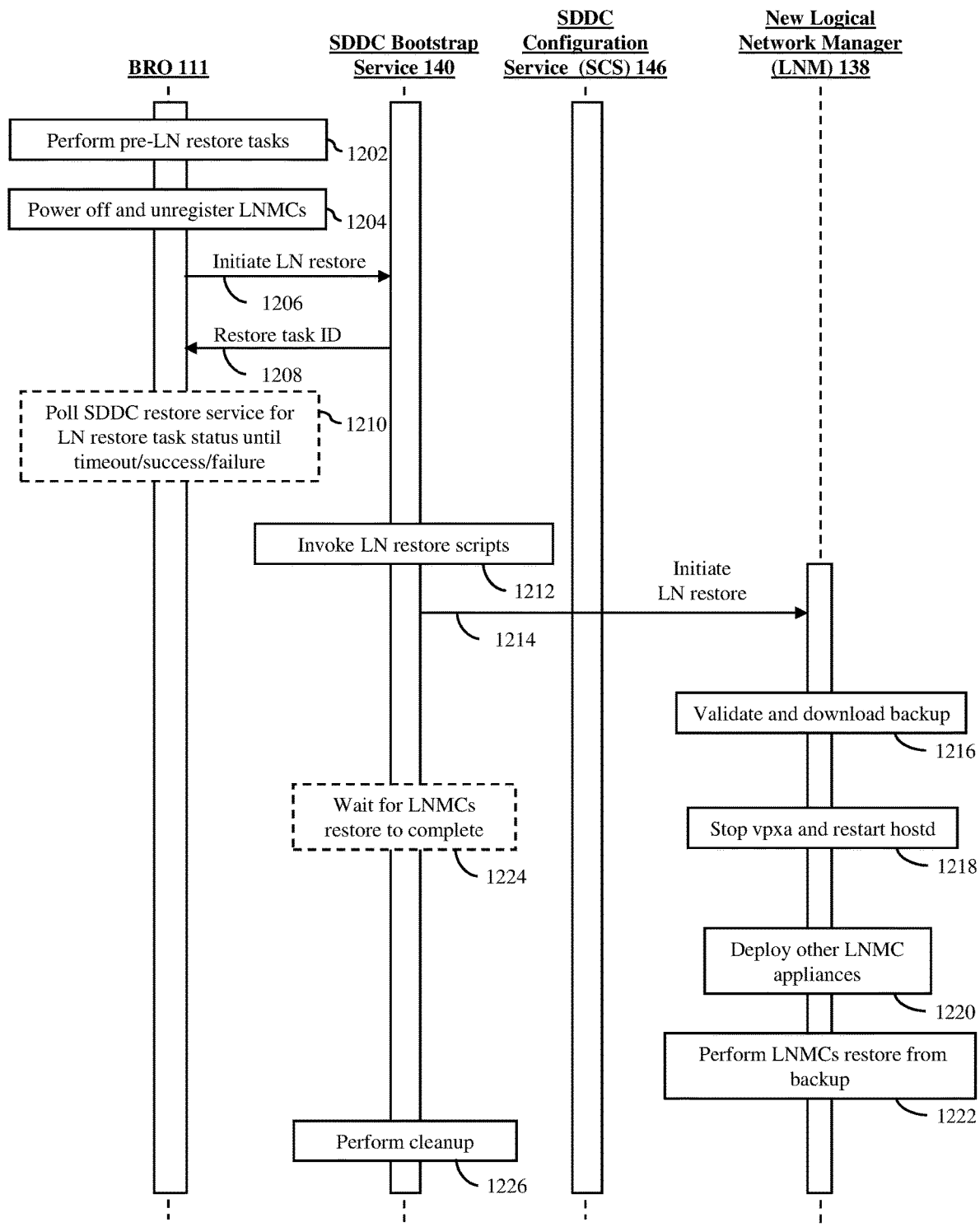
FIGS. 12A and 12B show a flow diagram of a process of restoring a logical network of the SDDC in the computing system shown in FIG. 10 in accordance with an embodiment of the invention.
Figure 12B:
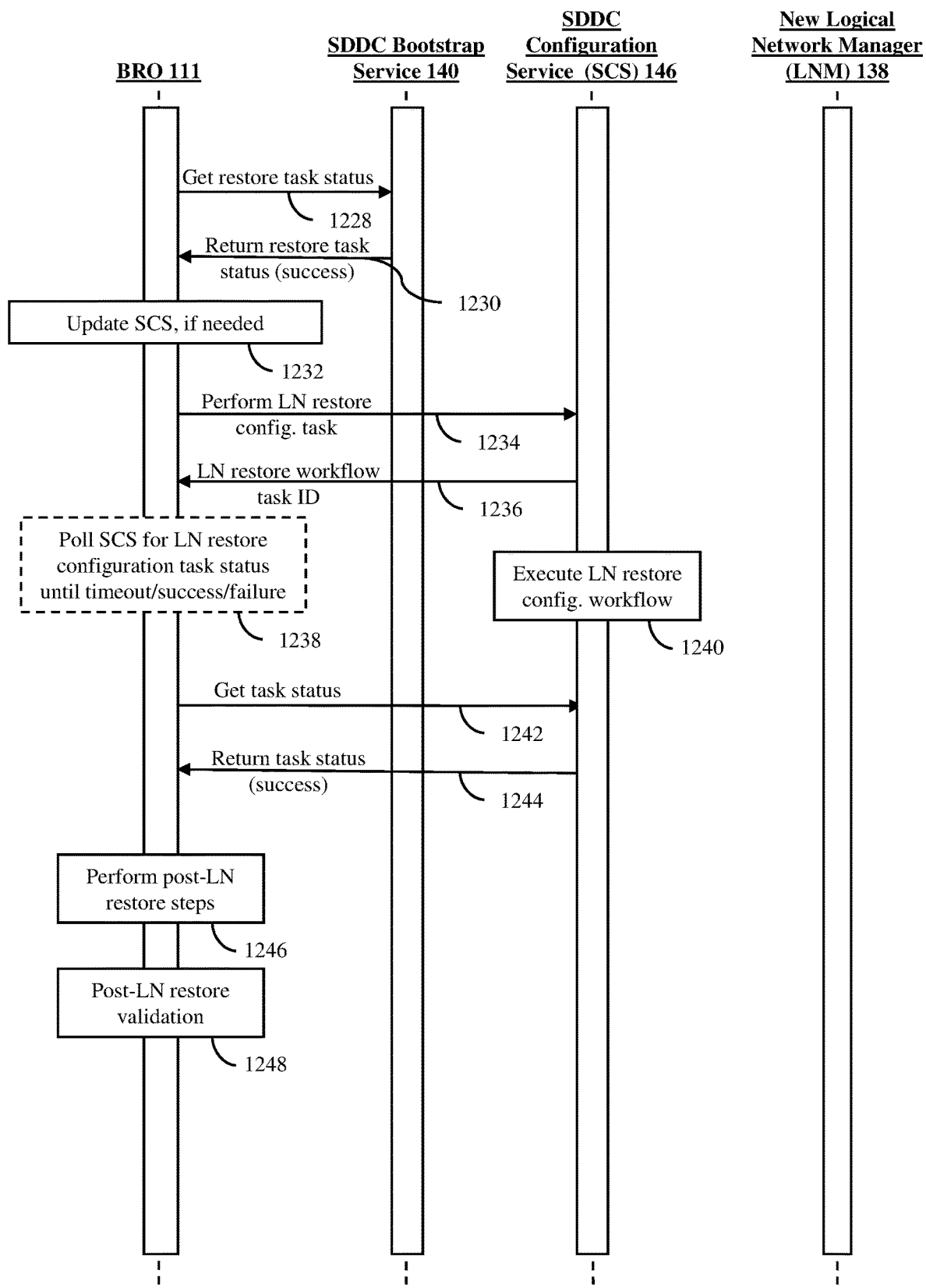

As shown in FIG. 12A, the process of restoring the logical network (LN) of the SDDC 104 begins at step 1202, where, in response to one or more triggering events, the pre-LN restore tasks are executed by the BRO 111. As an example, the pre-LN restore tasks may include, but not limited to, (a) ensure that the path(s) to download one or more management component deployment files for new logical network management components (LNMCs), e.g., a new LNM 138 and associated logical network management components, is/are provided in a backup specification and is accessible from any of the hosts 116 in the SDDC 104, (b) select and prepare one of the hosts 116 in the SDDC 104 to deploy the new LNMCs in the SDDC 104, and (c) setup the network needed for the new LNMCs.

Next, at step 1204, the existing LNMCs, which may be virtual machine appliances, are powered off and unregistered from the registration database by the BRO 111. In another embodiment, the existing LNMCs may be powered off and unregistered from the registration database at a later time by the SDDC bootstrap service 140.

Next, at step 1206, a request to initiate an LN restore task is sent to the SDDC bootstrap service 140, which is in the hypervisor 134 of the selected host 116 in the SDDC 104, from the BRO 111. Since each of the hosts include an SDDC bootstrap service, the request to initiate an LN restore task from the BRO 111 can be sent to the SDDC bootstrap service 140 in any of the hosts 116 in the cluster 114. Next, at step 1208, in response to the request to initiate an LN restore task, a restore task ID is generated and sent to the BRO 111 by the SDDC bootstrap service 140.

After receiving the restore task ID, the SDDC bootstrap service 140 is periodically polled for an LN restore task status by the BRO 111 until the task status indicates timeout, success or failure, as illustrated by the block 1210. If there is timeout or failure, one or more attempts may be made to complete the LN restore task. Alternatively, the LN restore process may be aborted in response to timeout or failure notification.

Next, at step 1212, LN restore scripts are executed by the SDDC bootstrap service 140. The LN restore scripts include steps to perform deployment and restore of LNMCs. Initially, as part of the execution of the LN restore scripts, a new LNM 138 is deployed in the SDDC 104. The deployment of the new LNM 138 can be executed using any known method to deploy such a management component in an existing SDDC. In an embodiment, the new LNM 138 is deployed as a virtual machine appliance. The LNM virtual machine appliance may be deployed by downloading one or more appropriate files, such as an OVA file, using, for example, HTTPS. In an embodiment, the LN restore scripts specify all the information needed to deploy the new LNM 138, including the location of the appropriate management component deployment file, such as an URL.

Once the new LNM 138 is up and running, at step 1214, as specified in the LN restore scripts, an instruction is sent to the new LNM from the SDDC bootstrap service 140 to initiate an LN restore process. In an embodiment, actions performed during the LN restore process include (a) validate and download backup, (b) stop and restart select services on the host, (c) deploy other LNMCs, e.g., as LNMC appliances, and (d) perform the restore of the LNMCs from backup configuration data, which are described in detail below.

Next, at step 1216, In response to the instruction from the SDDC bootstrap service 140, backup configuration data for the LNMCs being deployed is validated and downloaded by the new LNM 138, if properly validated. In an embodiment, the backup configuration data stored in the backup storage system 113 for the LNMCs being deployed is validated by checking to see if the location of the backup configuration data for restore is valid and whether the backup configuration data includes all the files needed to properly execute a restore operation on the LNMCs being deployed to the backup state of the previous LNMCs when the backup configuration data was created.

Next, at step 1218, select services running in the host 116 of the SDDC bootstrap service 140 are stopped and/or restarted. In a particular implementation, a CMC agent, e.g., a vpxa, is stopped and a host daemon management service, e.g., hostd, is restarted.

Next, at step 1220, other new LNMCs are deployed in the SDDC 104. Similar to the deployment of the new LNM 138, the deployment of these other LNMCs can be executed using any known method to deploy such management components in an existing SDDC. In an embodiment, these other new LNMCs are deployed as virtual machine appliances. The LNMC virtual machine appliances may be deployed by downloading appropriate files, such as OVA files, using, for example, HTTPS. In an embodiment, the LN restore scripts specify all the information needed to deploy these new LNMCs, including the location of the appropriate management component deployment files, such as URLs.

Next, at step 1222, a restore operation on the new LNMCs, including the new LNM 138, is performed by the new LNM 138 using the latest backup configuration data of the previous LNMCs. In an embodiment, the restore operation on the new LNMCs involves rebooting the new LNMCs and configuring the services in the new LNMCs using the configurations in the backup configuration data.

Meanwhile, the SDDC bootstrap service 140 waits for these LNMCs restore sub-tasks (steps 1216-1222) to be completed, as indicated by block 1224. After the restore sub-tasks have been successfully completed, a cleanup operation is performed by the SDDC bootstrap service 140, at step 1226. The cleanup operation involves removing and replacing any references to the old LNMCs with references to the new LNMCs in the SDDC 104.

Next, at step 1228, a request is made to the SDDC bootstrap service 140 by the BRO 111 for a LN restore task status, as part of the polling procedure being performed by the BRO. Next, at step 1230, a LN restore task status is sent to the BRO 111 by the SDDC bootstrap service 140. If the LN restore task status indicates that the LN restore task has been successfully performed, the process proceeds to step 1232. However, if the LN restore task status indicates timeout or failure, another attempt may be made to restore the logical network. Alternatively, the LN restore process may be aborted in response to timeout or failure notification.

Next, at step 1232, if the SDDC configuration service (SCS) 146 needs to be updated, the SCS 146 is updated by the BRO 111. The determination of whether or not the SCS 146 in the SDDC 104 needs to be updated is made by the BRO 111, for example, by checking the version of the current SCS 146 in the SDDC 104 and updating the SCS to a new version, if there is one.

Next, at step 1234, an instruction to perform a logical network (LN) restore configuration task is sent to the SCS 146 from the BRO 111. Next, at step 1236, in response to the instruction to perform an LN restore configuration task, an LN restore configuration task ID is generated and sent to the BRO 111 by the SCS 146.

After receiving the LN restore configuration task ID, the SCS 146 is periodically polled for a LN restore configuration task status by the BRO 111 until the task status indicates timeout, success or failure, as illustrated by the block 1238. If there is timeout or failure, one or more attempts may be made to complete the LN restore configuration task. Alternatively, the LN restore process may be aborted in response to timeout or failure notification.

Next, at step 1240, an LN restore configuration workflow is executed by the SCS 146. In an embodiment, the LN restore workflow may involve (a) removing the old LNM virtual machine from the CMC inventory, which may be maintained by the SCS 146 or another entity, (b) moving the new LNM virtual machine to a management virtual machine folder and a management resource pool, (c) adding distributed resource scheduler (DRS) anti-affinity rules for LN controllers in the new LNM 138, (d) setting the desired virtual storage profile to the management virtual machines, (e) setting the restart priority for the CMC virtual machine to the highest priority, and (f) setting the CPU and memory reservations to the LNM virtual machine.

Next, at step 1242, a request is made to the SCS 146 by the BRO 111 for an LN restore configuration task status, as part of the polling procedure being performed by the BRO. Next, at step 1244, an LN restore configuration task status is sent to the BRO 111 by the SCS 146. If the LN restore configuration task status indicates that the LN restore configuration task has been successfully performed, the process proceeds to step 1246. However, if the LN restore configuration task status indicates timeout or failure, another attempt may be made to configure the LN of the SDDC 104. Alternatively, the LN restore process may be aborted in response to timeout or failure notification.

Next, at step 1246, one or more post-LN restore steps are performed by the BRO 111. The post-LN restore steps may include at least configuring the new LNMCs, including the new LNM 138, to be backed up periodically, e.g., every 24 hours, and the resulting backup configuration data to be stored in the backup storage system 113. Next, at step 1248, a post-LN restore validation is performed by the BRO 111. The post-LN restore validation involves verifying whether the new LNMCs are operating properly.

In the above CMC and LN restore processes, instructions and request may be made using API calls or any messaging protocol. In some situations, only the CMC restore process is executed to address the triggering event(s). In other situations, only the LN restore process is executed to address the triggering event(s). Still in other situations, both the CMC and LN restore processes are executed to address the triggering event(s).

Figure 13:
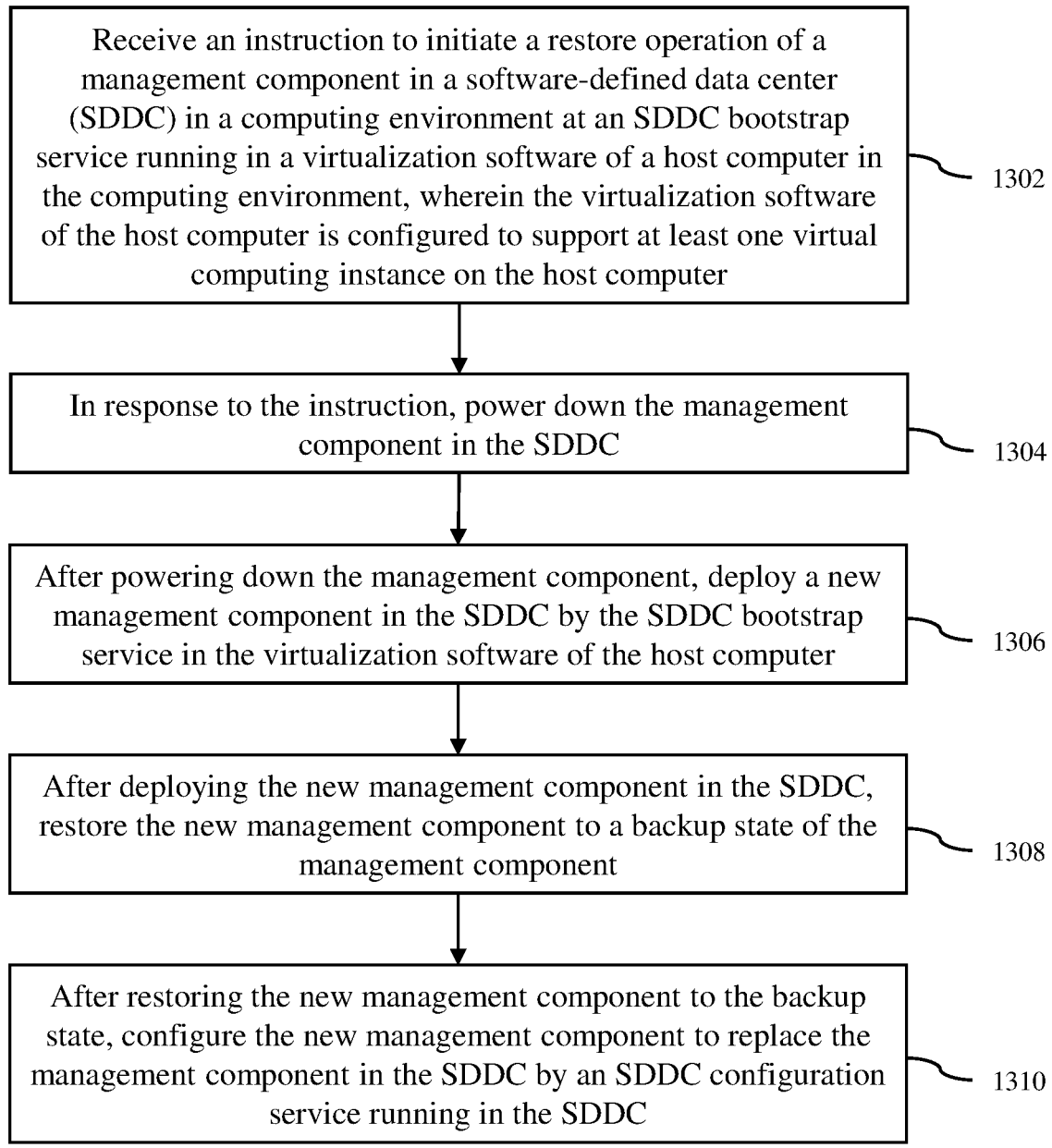
FIG. 13 is a flow diagram of a computer-implemented method for restoring management components of SDDCs in computing environments in accordance with an embodiment of the invention.

A computer-implemented method for restoring management components of software-defined data centers (SDDCs) in computing environments in accordance with an embodiment of the invention is described with reference to a flow diagram of FIG. 13. At block 1302, an instruction to initiate a restore operation of a management component in a software-defined data center (SDDC) in a computing environment is received at an SDDC bootstrap service running in a virtualization software of a host computer in the computing environment. The virtualization software of the host computer is configured to support at least one virtual computing instance on the host computer. At block 1304, in response to the instruction, the management component in the SDDC is powered down. At block 1306, after powering down the management component, a new management component in the SDDC is deployed by the SDDC bootstrap service in the virtualization software of the host computer. At block 1308, after deploying the new management component in the SDDC, the new management component is restored to a backup state of the management component. At block 1310, after restoring the new management component to the backup state, the new management component is configured to replace the management component in the SDDC by an SDDC configuration service running in the SDDC.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for deploying software-defined data centers (SDDCs) in target computing environments, the method comprising:

receiving, at a first host of a plurality of hosts and from an SDDC worker service in a private cloud management service, a request to deploy an SDDC in a target computing environment, wherein each of the plurality of hosts comprises a respective hypervisor configured to support at least one respective virtual computing instance (VCI) of a plurality of VCIs, each respective hypervisor running a respective SDDC bootstrap service and a respective logical network agent, each respective logical network agent providing logical networking capabilities to the at least one respective VCI and implementing at least a portion of one or more logical overlay networks that include software managed and implemented network services;

deploying, by a first SDDC bootstrap service running on a first hypervisor of the first host and in response to the request, a plurality of management components of the SDDC in the target computing environment, wherein a particular management component of the management components includes an SDDC configuration service; and after deploying the management components of the SDDC in the target computing environment, configuring the SDDC to a desired state by the SDDC configuration service running in the particular management component using an SDDC desired state specification.

2. The computer-implemented method of claim 1, wherein the management components of the SDDC includes a cluster management center, and wherein configuring the SDDC to the desired state includes instructing the cluster management center to configure a cluster of host computers in the SDDC to a particular state.

3. The computer-implemented method of claim 1, wherein the management components of the SDDC includes a logical network manager, and wherein configuring the SDDC to the desired state includes instructing the logical network manager to configure the one or more logical overlay networks to a particular state.

4. The computer-implemented method of claim 1, wherein the management components of the SDDC includes a virtual storage manager, and wherein configuring the SDDC to the desired state includes instructing the virtual storage manager to configure a virtual storage of the SDDC to a particular state.

5. The computer-implemented method of claim 4, wherein the virtual storage manager is integrated into a cluster management center, and wherein instructing the virtual storage manager includes instructing the cluster management center to configure the virtual storage of the SDDC to the particular state.

6. The computer-implemented method of claim 1, further comprising, prior to deploying the management components, creating storage and network resources to be used by the management components using the SDDC bootstrap service.

7. The computer-implemented method of claim 6, wherein the SDDC bootstrap service in the hypervisor includes at least one of a storage bootstrapper, a logical network bootstrapper and an appliance bootstrapper, the storage bootstrapper being configured to create the storage resources, the logical network bootstrapper being configured to create the network resources, the appliance bootstrapper being configured to deploy the management components.

8. The computer-implemented method of claim 1, wherein at least one of the management components that are deployed includes a desired state controller, and wherein configuring the SDDC to the desired state includes instructing the desired state controller to configure the SDDC with respect to a cluster of host computers in the SDDC, a virtual storage of the SDDC or a logical network of the SDDC.

9. The computer-implemented method of claim 1, wherein the management components that are deployed comprise a cluster management center, a virtual storage manager, and a logical network manager, wherein the one or more logical overlay networks comprise a first logical overlay network used by the plurality of VCIs, and wherein the logical management components communicate using a management network that is separate from the first logical overlay network.

10. A non-transitory computer-readable storage medium containing program instructions for deploying software-defined data centers (SDDCs) in target computing environments, wherein execution of the program instructions by one or more processors of a computer system causes the one or more processors to perform operations comprising:

receiving, at a first host of a plurality of hosts and from an SDDC worker service in a private cloud management service, a request to deploy an SDDC in a target computing environment, wherein each of the plurality of hosts comprises a respective hypervisor configured to support at least one respective virtual computing instance (VCI) of a plurality of VCIs, each respective hypervisor running a respective SDDC bootstrap service and a respective logical network agent, each respective logical network agent providing logical networking capabilities to the at least one respective VCI and implementing at least a portion of one or more logical overlay networks that include software managed and implemented network services;

deploying, by a first SDDC bootstrap service running on a first hypervisor of the first host and response to the request, a plurality of management components of the SDDC in the target computing environment, wherein a particular management component of the management components includes an SDDC configuration service; and after deploying the management components of the SDDC in the target computing environment, configuring the SDDC to a desired state by the SDDC configuration service running in the particular management component using an SDDC desired state specification.

11. The non-transitory computer-readable storage medium of claim 10, wherein the management components of the SDDC includes a cluster management center, and wherein configuring the SDDC to the desired state includes instructing the cluster management center to configure a cluster of host computers in the SDDC to a particular state.

12. The non-transitory computer-readable storage medium of claim 10, wherein the management components of the SDDC includes a logical network manager, and wherein configuring the SDDC to the desired state includes instructing the logical network manager to configure the one or more logical overlay networks to a particular state.

13. The non-transitory computer-readable storage medium of claim 10, wherein the management components of the SDDC includes a virtual storage manager, and wherein configuring the SDDC to the desired state includes instructing the virtual storage manager to configure a virtual storage of the SDDC to a particular state.

14. The non-transitory computer-readable storage medium of claim 13, wherein the virtual storage manager is integrated into a cluster management center, and wherein instructing the virtual storage manager includes instructing the cluster management center to configure the virtual storage of the SDDC to the particular state.

15. The non-transitory computer-readable storage medium of claim 10, wherein the steps further comprise, prior to deploying the management components, creating storage and network resources to be used by the management components using the SDDC bootstrap service.

16. The non-transitory computer-readable storage medium of claim 15, wherein the SDDC bootstrap service in the hypervisor includes at least one of a storage bootstrapper, a logical network bootstrapper and an appliance bootstrapper, the storage bootstrapper being configured to create the storage resources, the logical network bootstrapper being configured to create the network resources, the appliance bootstrapper being configured to deploy the management components.

17. The non-transitory computer-readable storage medium of claim 10, wherein at least one of the management components that are deployed includes a desired state controller, and wherein configuring the SDDC to the desired state includes instructing the desired state controller to configure the SDDC with respect to a cluster of host computers in the SDDC, a virtual storage of the SDDC or a logical network of the SDDC.

18. The non-transitory computer-readable storage medium of claim 10, wherein the management components that are deployed includes a cluster management center with a first desired state controller, a virtual storage manager with a second desired state controller and a logical network manager with a third desired controller, and wherein configuring the SDDC to the desired state includes instructing the first desired state controller of the cluster management center to configure a cluster of host computers in the SDDC to a particular state, instructing the second desired state controller of the virtual storage manager to configure a virtual storage of the SDDC and instructing the third desired state controller of the logical network manager to configure a logical overlay network of the SDDC.

19. A computer system comprising:
   at least one processor; and
   a non-transitory computer-readable storage medium containing program instructions for deploying software-defined data centers (SDDCs) in target computing environments, wherein execution of the program instructions by the at least one processor causes the at least one processor to perform operations comprising:
   receiving, at a first host of a plurality of hosts and from an SDDC worker service in a private cloud management service, a request to deploy an SDDC in a target computing environment, wherein each of the plurality of hosts comprises a respective hypervisor configured to support at least one respective virtual computing instance (VCI) of a plurality of VCIs, each respective hypervisor running a respective SDDC bootstrap service and a respective logical network agent, each respective logical network agent providing logical networking capabilities to the at least one respective VCI and implementing at least a portion of one or more logical overlay networks that include software managed and implemented network services;
   deploying, by a first SDDC bootstrap service running on a first hypervisor of the first host and in response to receiving the request, a plurality of management components of the SDDC in the target computing environment, wherein a particular management component of the management components includes an SDDC configuration service; and
   after deploying the management components of the SDDC in the target computing environment, configuring the SDDC to a desired state by the SDDC configuration service running in the particular management component using an SDDC desired state specification.

20. The computer system of claim 19, wherein at least one of the management components that are deployed includes a desired state controller, and wherein the at least one processor is configured to includes instructing the desired state controller to configure the SDDC with respect to a cluster of host computers in the SDDC, a virtual storage of the SDDC or a logical network of the SDDC to configure the SDDC to the desired state.

* * * * *